United States Patent
Kim et al.

(10) Patent No.: US 11,417,954 B2
(45) Date of Patent: Aug. 16, 2022

(54) ELECTRONIC DEVICE COMPRISING ANTENNA ARRAY

(71) Applicants: Samsung Electronics Co., Ltd., Suwon-si (KR); POSTECH ACADEMY-INDUSTRY FOUNDATION, Pohang-si (KR)

(72) Inventors: Yeonwoo Kim, Suwon-si (KR); Wonbin Hong, Seoul (KR); Sehyun Park, Suwon-si (KR); Junho Park, Pohang-si (KR); Sumin Yun, Suwon-si (KR)

(73) Assignees: Samsung Electronics Co., Ltd, Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 17/262,087

(22) PCT Filed: Jul. 31, 2019

(86) PCT No.: PCT/KR2019/009528
§ 371 (c)(1),
(2) Date: Jan. 21, 2021

(87) PCT Pub. No.: WO2020/027568
PCT Pub. Date: Feb. 6, 2020

(65) Prior Publication Data
US 2021/0305694 A1    Sep. 30, 2021

(30) Foreign Application Priority Data
Aug. 1, 2018    (KR) .......................... 10-2018-0089974

(51) Int. Cl.
| | | |
|---|---|---|
| *H01Q 3/36* | (2006.01) | |
| *H04W 16/28* | (2009.01) | |
| *H04B 7/06* | (2006.01) | |

(52) U.S. Cl.
CPC ............. *H01Q 3/36* (2013.01); *H04B 7/0682* (2013.01); *H04W 16/28* (2013.01)

(58) Field of Classification Search
CPC ................. H01Q 1/2283; H01Q 1/243; H01Q 21/0025; H01Q 21/08; H01Q 21/293;
(Continued)

(56) References Cited

U.S. PATENT DOCUMENTS 6,266,015 B1    7/2001    Heckaman et al.
9,843,111 B2 *  12/2017   Ying ........................ H01Q 1/50
(Continued)

FOREIGN PATENT DOCUMENTS

| KR | 10-1212354 B1 | 12/2012 |
|---|---|---|
| KR | 10-2017-0077787 A | 7/2017 |

(Continued)

OTHER PUBLICATIONS

Extended European Search Report dated Jul. 7, 2021, issued in European Patent Application No. 19845170.0.

*Primary Examiner* — Tan H Trinh
(74) *Attorney, Agent, or Firm* — Jefferson IP Law, LLP

(57) ABSTRACT

An electronic device according to an embodiment of the present invention may include a housing and an antenna module disposed on one surface of the housing, wherein the antenna module may include a printed circuit board including a first layer facing the one surface of the housing, a second layer facing the first layer, and at least one ground layer disposed between the first layer and the second layer, a first antenna array disposed on the first layer, a second antenna array disposed on the second layer and at least
(Continued)

partially overlapping the first antenna array when viewed from the one surface of the housing, and a communication circuit (radio frequency integrated circuit (RFIC)) electrically connected to the first antenna array and the second antenna array and feeding the first antenna array and the second antenna array, wherein the communication circuit may be configured to receive a first signal from an external device via at least one of the first antenna array or the second antenna array, change a phase of at least a portion of the first antenna array and the second antenna array based on the first signal, and transmit/receive a second signal in a direction of a beam formed by the changed phase. Other various embodiments could be derived from the description.

19 Claims, 25 Drawing Sheets

(58) Field of Classification Search
CPC .......... H01Q 25/005; H01Q 3/30; H01Q 3/36; H01Q 9/0407; H04B 7/0682; H04W 16/28
USPC .................. 455/562.1; 343/700 MS, 727
See application file for complete search history.

(56) References Cited

U.S. PATENT DOCUMENTS

| | | | |
|---|---|---|---|
| 9,905,922 | B2 | 2/2018 | Lee et al. |
| 10,096,891 | B2* | 10/2018 | Choudhury .............. H01Q 1/38 |
| 10,554,240 | B2 | 2/2020 | Han et al. |
| 10,680,663 | B2 | 6/2020 | Ouyang et al. |
| 10,693,217 | B2 | 6/2020 | Choudhury et al. |
| 11,025,285 | B2 | 6/2021 | Ouyang et al. |
| 2010/0090902 | A1* | 4/2010 | Thompson ............. H01Q 21/24 343/700 MS |
| 2015/0070228 | A1* | 3/2015 | Gu ........................ H01Q 25/00 343/727 |
| 2016/0064816 | A1* | 3/2016 | Preradovic ............... H01Q 3/24 455/562.1 |
| 2017/0302306 | A1* | 10/2017 | Ouyang ................... H04B 1/04 |
| 2019/0020100 | A1* | 1/2019 | Jong ....................... H01Q 1/523 |
| 2020/0091608 | A1* | 3/2020 | Alpman ............... H01Q 25/001 |
| 2021/0004117 | A1* | 1/2021 | Kim ..................... H04M 1/0266 |
| 2021/0083398 | A1* | 3/2021 | Ko ........................ H01Q 21/061 |

FOREIGN PATENT DOCUMENTS

| | | |
|---|---|---|
| KR | 10-2017-0135980 A | 12/2017 |
| KR | 10-1874077 B1 | 7/2018 |
| KR | 10-2019-0007734 A | 1/2019 |

\* cited by examiner

ELECTRONIC DEVICE COMPRISING ANTENNA ARRAY

TECHNICAL FIELD

Embodiments of the present disclosure relate to an electronic device including an antenna array.

BACKGROUND ART

With the recent popularization of electronic devices (e.g., smartphones), network traffic rapidly increases due to such electronic devices. Researches are actively carried out to develop a next-generation mobile communication technology using ultra-high frequency band signals, such as a 5th generation mobile communication (5G) technology, in order to improve the traffic. If the 5th generation mobile communication technology is used, a larger amount of information may be transmitted and/or received since a wider bandwidth may be used.

DISCLOSURE OF THE INVENTION

Technical Problem

In order to use the 5th generation mobile communication technology, an electronic device may include an antenna array. Since an antenna array has effective isotropically radiated power (EIRP) higher than that of a single antenna, a variety of data may be transmitted and/or received more efficiently.

However, depending on antennas included in an antenna array, a signal transmission/reception rate for a particular direction may be significantly low. For example, in the case where an antenna array including patch antennas is oriented towards a rear cover of an electronic device, the signal transmission/reception rate for a side direction of the electronic device may be significantly low. For another example, in the case where an antenna array including dipole antennas is oriented towards a side of an electronic device, the signal transmission/reception rate for a rear cover direction of the electronic device may be significantly low.

Embodiments of the present disclosure provide an electronic device for improving the signal transmission/reception rate for various directions by adjusting a phase of an antenna array.

Technical Solution

An electronic device according to an embodiment of the present disclosure may include a housing and an antenna module disposed on one surface of the housing, wherein the antenna module may include a printed circuit board including a first layer facing the one surface of the housing, a second layer facing the first layer, and at least one ground layer disposed between the first layer and the second layer, a first antenna array disposed on the first layer, a second antenna array disposed on the second layer and at least partially overlapping the first antenna array when viewed from the one surface of the housing, and a communication circuit (radio frequency integrated circuit (RFIC)) electrically connected to the first antenna array and the second antenna array and feeding the first antenna array and the second antenna array, wherein the communication circuit may be configured to receive a first signal from an external device via at least one of the first antenna array or the second antenna array, change a phase of at least a portion of the first antenna array and the second antenna array based on the first signal, and transmit/receive a second signal in a direction of a beam formed by the changed phase.

Furthermore, an antenna module according to an embodiment of the present disclosure may include a printed circuit board including a first layer, a second layer facing the first layer, and at least one ground layer disposed between the first layer and the second layer, a first antenna array disposed on the first layer, a second antenna array disposed on the second layer and at least partially overlapping the first antenna array when viewed above the first layer, and a communication circuit (radio frequency integrated circuit (RFIC)) electrically connected to the first antenna array and the second antenna array and feeding the first antenna array and the second antenna array, wherein the communication circuit may be configured to receive a first signal from an external device via at least one of the first antenna array or the second antenna array, change a phase of at least a portion of the first antenna array and the second antenna array based on the first signal, and transmit/receive a second signal in a direction of a beam formed by the changed phase.

Furthermore, an electronic device according to an embodiment of the present disclosure may include: a housing including a first plate, a second plate oriented in an opposite direction to the first plate, and a side member surrounding a space between the first plate and the second plate and coupled to the second plate or integrated with the second plate; a display viewed through at least a portion of the first plate; an antenna structure disposed inside the housing and including a printed circuit board including a first surface oriented in a first direction and a second surface oriented in a second direction opposite to the first direction, a first region including a first antenna array which includes a plurality of first antenna elements formed in the printed circuit board or on the first surface, a second region including a second antenna array which includes a plurality of second antenna elements formed closer to the second surface than the plurality of first antenna elements in the printed circuit board or formed on the second surface and at least partially overlapping the first region when viewed above the first surface, and ground layers disposed between the first antenna array and the second antenna array in the printed circuit board and at least partially overlapping the first region and the second region when viewed above the first surface; and at least one wireless communication circuit electrically connected to the first antenna array and the second antenna array and configured to transmit and/or receive a signal having a frequency between 3 GHz and 100 GHz.

Advantageous Effects

According to embodiments of the present disclosure, since an additional antenna array is not required for each direction, a mounting space of an electronic device may be efficiently used.

Furthermore, according to embodiments of the present disclosure, a beam may be steered to various directions by adjusting the phase of an antenna array, and, accordingly, beam coverage increases, thus improving the signal transmission/reception rate.

Besides, various effects may be provided that are directly or indirectly identified through the present disclosure.

MODE FOR CARRYING OUT THE INVENTION

Figure 1:
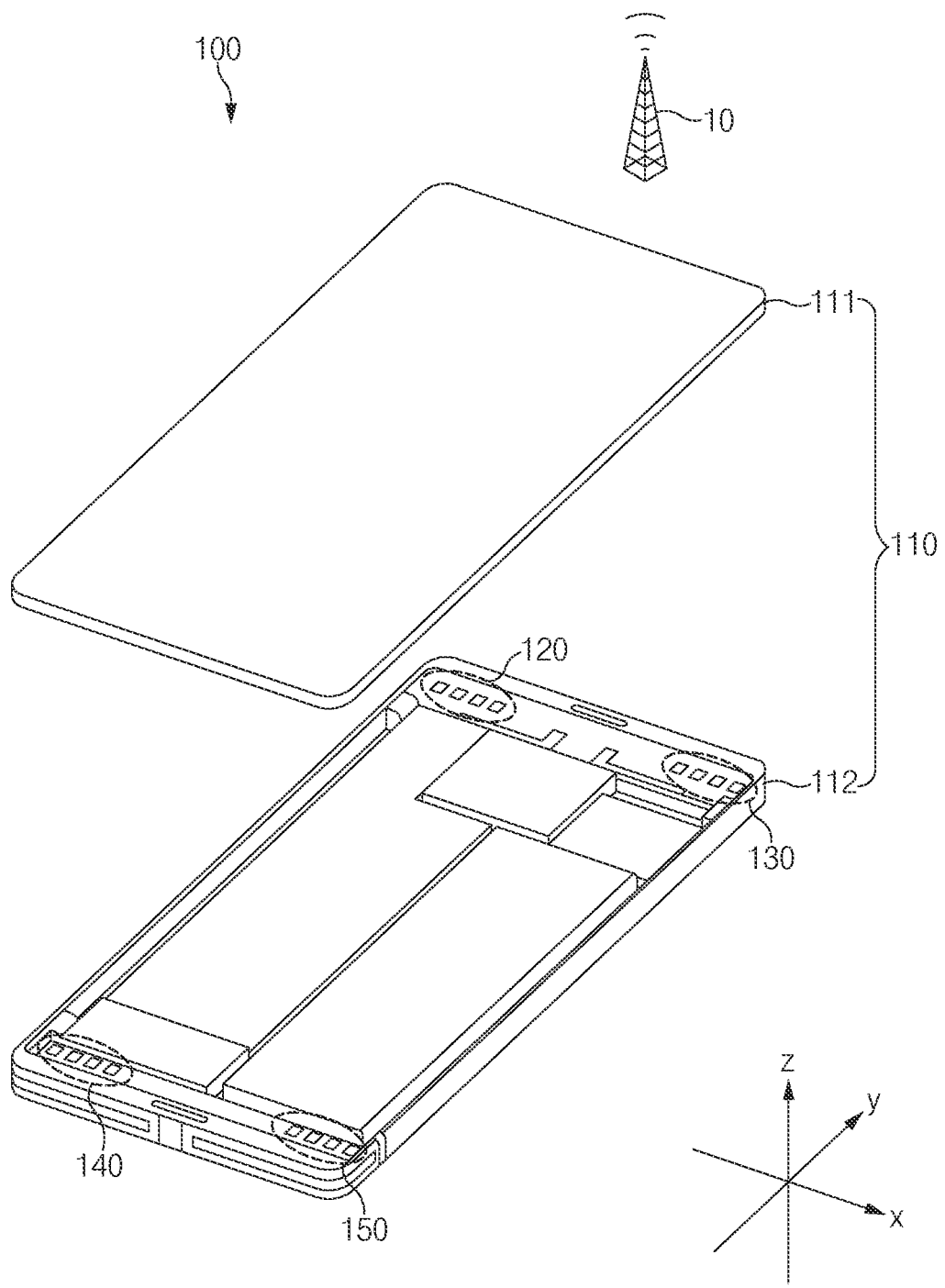
FIG. 1 illustrates an exploded perspective view of an electronic device according to an embodiment.

FIG. 1 illustrates an exploded perspective view of an electronic device according to an embodiment.

Referring to FIG. 1, an electronic device 100 may include a housing 110 and at least one of first to fourth antenna modules 120, 130, 140, and 150.

The housing 110 may form an exterior of the electronic device 100, thus protecting various components (e.g., a display, a battery) included in the electronic device 100 from an external impact. According to an embodiment, the housing 110 may include a rear cover 111 (or a second plate) and a side member 112. The rear cover 111 may be formed of tempered glass, plastic, and/or metal. The rear cover 111 may be integrated with the side member 112, or may be implemented so as to be detachable by a user.

According to an embodiment, the first to fourth antenna modules 120, 130, 140, and 150 may be arranged inside the electronic device 100. The first to fourth antenna modules 120, 130, 140, and 150 may face the rear cover 111. According to an embodiment, the first to fourth antenna modules 120, 130, 140, and 150 may be arranged in regions adjacent to each corner of the electronic device 100.

An antenna module (e.g., the first antenna module 120 illustrated in FIG. 1) according to an embodiment of the present invention may change a signal transmitting/receiving direction according to situations. For example, when it is determined that a most adjacent external device 10 (e.g., a base station) is present in a y direction with respect to the electronic device 100 while the electronic device 100 is transmitting/receiving a signal in a z direction, the electronic device 100 may change a phase of a current applied to the antenna module (e.g., the first antenna module 120 illustrated in FIG. 1). When the phase is changed, the antenna module (e.g., the first antenna module 120 illustrated in FIG. 1) may transmit/receive a signal in the y direction.

In the present disclosure, the descriptions provided with reference to FIG. 1 may also be applied to configurations assigned the same reference signs as the electronic device 100 and the first to fourth antenna modules 120, 130, 140, and 150 illustrated in FIG. 1. Furthermore, the descriptions given for the first antenna module 120 may also be applied to the second to fourth antenna modules 130 to 150.

Figure 2A:
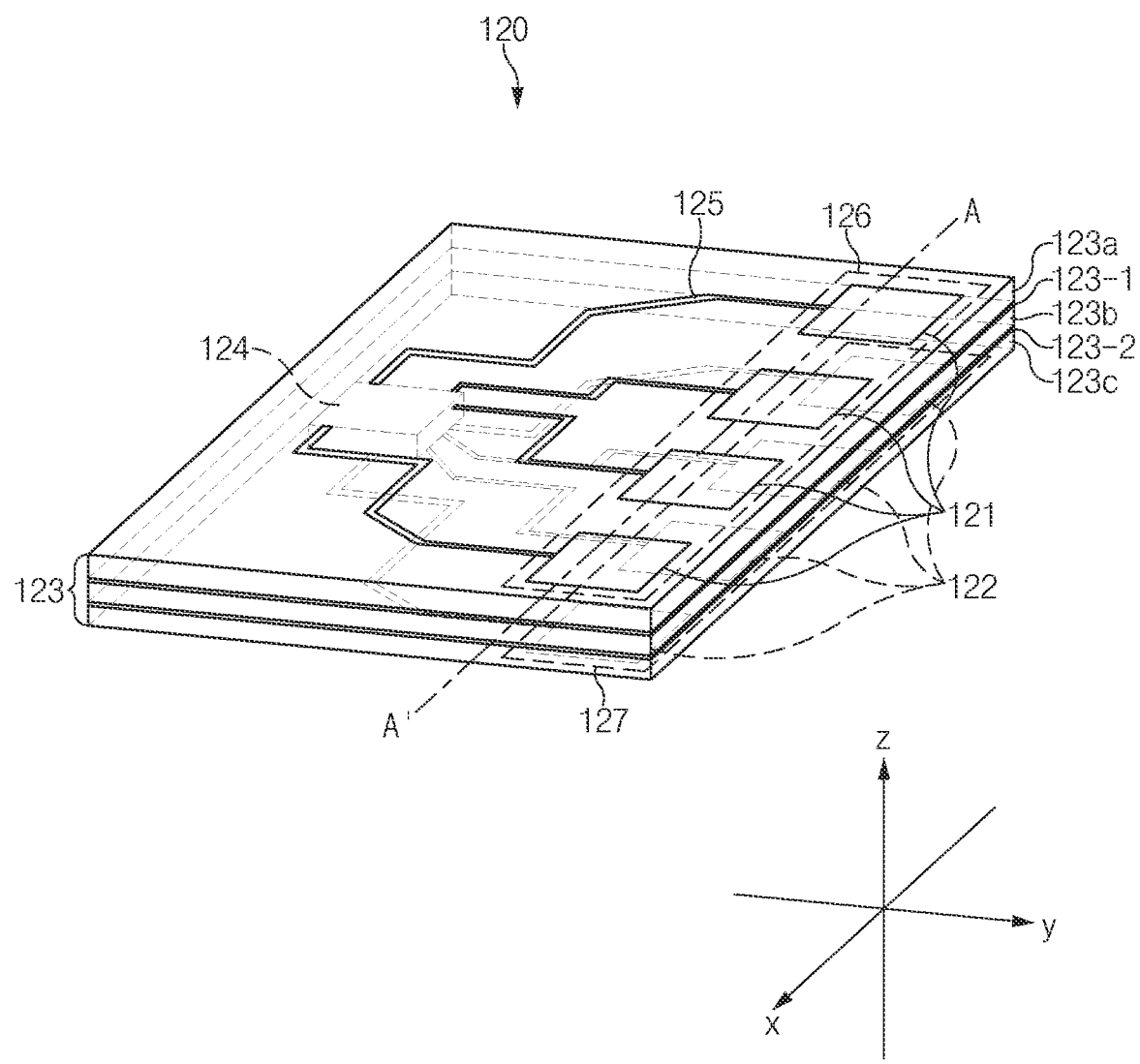
FIG. 2A illustrates a first antenna module according to an embodiment.

FIG. 2A illustrates a first antenna module according to an embodiment. FIG. 2A is a diagram related to an antenna module including a feeding structure of a micro strip 125 and a patch antenna.

Figure 2B:
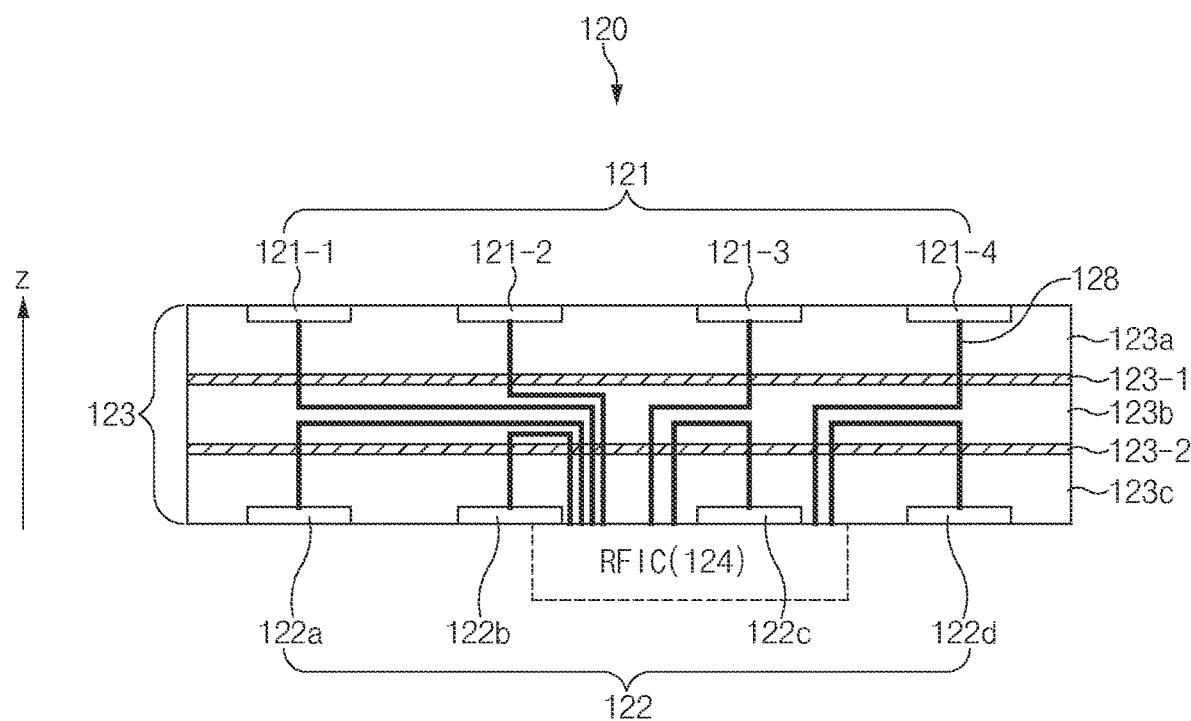
FIG. 2B is a cross-sectional view of the first antenna module according to an embodiment.

FIG. 2B is a cross-sectional view of the first antenna module according to an embodiment. FIG. 2B illustrates a cross-section of the first antenna module 120 taken along line A-A' illustrated in FIG. 2A. FIG. 2B is a diagram related to an antenna module including a feeding structure of a probe 128 and a patch antenna. The feeding structures or feeding methods illustrated in FIGS. 2A and 2B are merely examples, and various embodiments of the present invention are not limited to the illustrations of FIGS. 2A and 2B.

Referring to FIGS. 2A and 2B, the first antenna module 120 may include a printed circuit board 123, a first antenna array 121, a second antenna array 122, and/or a communication circuit 124 (radio frequency integrated circuit (RFIC)).

According to an embodiment, the printed circuit board 123 may include a plurality of layers 123a, 123b, 123c, 123-1, and 123-2. At least a portion of the plurality of layers 123a, 123b, 123c, 123-1, and 123-2 may include a conductive layer. For example, the printed circuit board 123 may include a first layer 123a (or a first surface), a second layer 123b, a third layer 123c (or a second surface), a first ground layer 123-1 arranged between the first layer 123a and the second layer 123b, and a second ground layer 123-2 arranged between the second layer 123b and the third layer 123c. In the present disclosure, the term "ground layer" may be referred to as "ground layer".

According to an embodiment, the first antenna array 121 may be arranged in the first layer 123a and may include a plurality of antenna elements. For example, the plurality of antenna elements may include a plurality of patch antennas 121-1, 121-2, 121-3, and 121-4. The patch antennas 121-1, 121-2, 121-3, and 121-4 may be aligned in an x direction in the first layer 123a, and each of the patch antennas 121-1, 121-2, 121-3, and 121-4 may be electrically connected to the communication circuit 124 (e.g., RFIC).

According to an embodiment, the second antenna array 122 may be arranged in the third layer 123c and may include a plurality of antenna elements. For example, the plurality of antenna elements may include a plurality of patch antennas 122a, 122b, 122c, and 122d. The patch antennas 122a, 122b, 122c, and 122d may be aligned in the x direction in the third layer 123c, and each of the patch antennas 122a, 122b, 122c, and 122d may be electrically connected to the communication circuit 124. In the present disclosure, the descriptions given for the first antenna array 121 may also be applied to the second antenna array 122.

According to an embodiment, the printed circuit board 123 may include a first region 126 and a second region 127. The first region 126 may represent a region including the plurality of patch antennas 121-1, 121-2, 121-3, and 121-4 formed in the first layer 123a. The second region 127 may represent a region including the plurality of patch antennas 122a, 122b, 122c, and 122d formed in the third layer 123c. According to an embodiment, the first region 126 and the second 127 may at least partially overlap when viewed above the first layer 123a.

According to an embodiment, the communication circuit 124 may be attached to one surface of the printed circuit board 123. For example, the communication circuit 124 may be attached to the third layer 123c in the z direction. According to an embodiment, the communication circuit 124 may be electrically connected to the first antenna array 121 and the second antenna array 122. The communication circuit 124 may transmit/receive a signal of a specified frequency band (e.g., 3 GHz to 100 GHz) by feeding each of the first antenna array 121 and the second antenna array 122.

According to an embodiment, the communication circuit 124 may change a direction of a signal to be transmitted/received by changing a phase of current fed to the first antenna array 121 and the second antenna array 122. For example, when the external device 10 (e.g., a base station) is present in the z direction with respect to the electronic device 100, the communication circuit 124 may apply currents having substantially the same phase to the first antenna array 121 and the second antenna array 122 to transmit and/or receive a signal in the z direction. For another example, when the external device 10 (e.g., a base station) is present in the y direction with respect to the electronic device 100, the communication circuit 124 may apply currents having different phases (e.g., 180°) to the first antenna array 121 and the second antenna array 122 to transmit and/or receive a signal in the y direction. The above examples are merely illustrative, and the electronic device may also transmit/receive a signal in a direction (e.g., a direction between the z direction and the y direction, the x direction) other than the z direction and the y direction.

In the present disclosure, substantially the same descriptions as given with reference to FIGS. 2A and 2B may be applied to configurations assigned the same reference sign as the first antenna module 120 illustrated in FIGS. 2A and 2B. Furthermore, the structure of the first antenna module 120 illustrated in FIGS. 2A and 2B are merely illustrative, and embodiments of the present invention are not limited to the structure of the first antenna module 120 illustrated in FIGS. 2A and 2B.

Figure 2C:
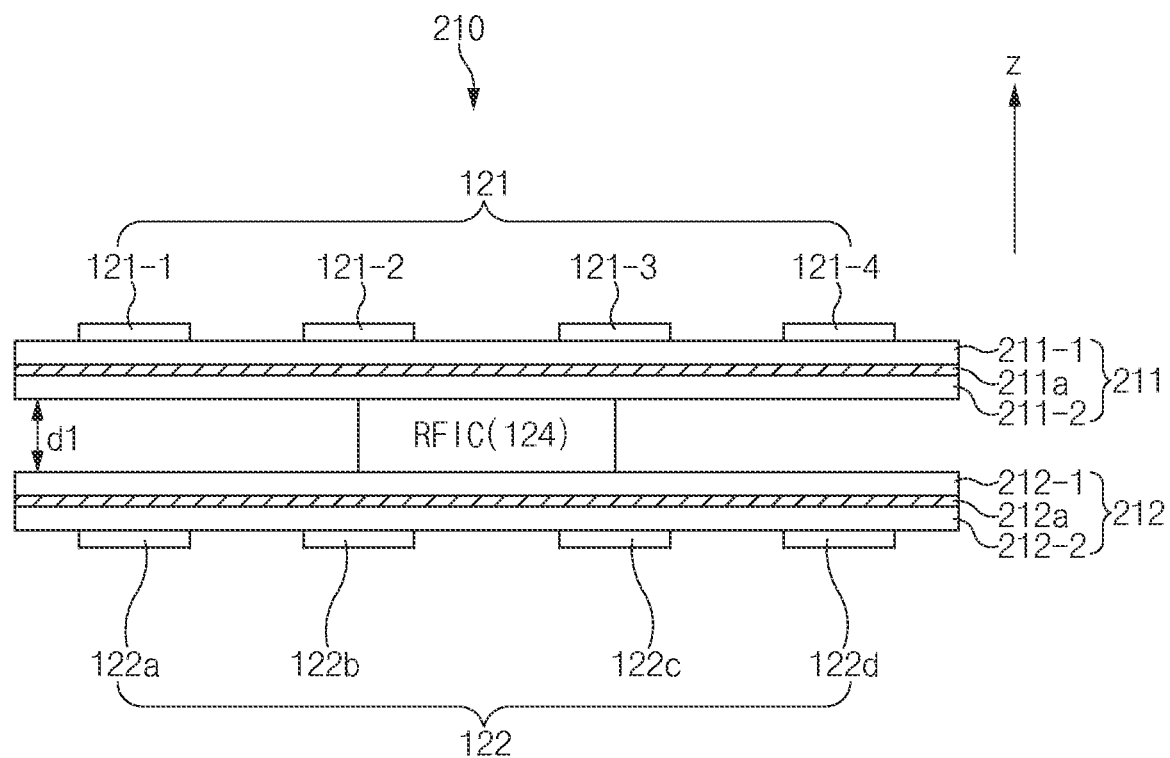
FIG. 2C illustrates a first antenna module according to another embodiment.
Figure 2D:
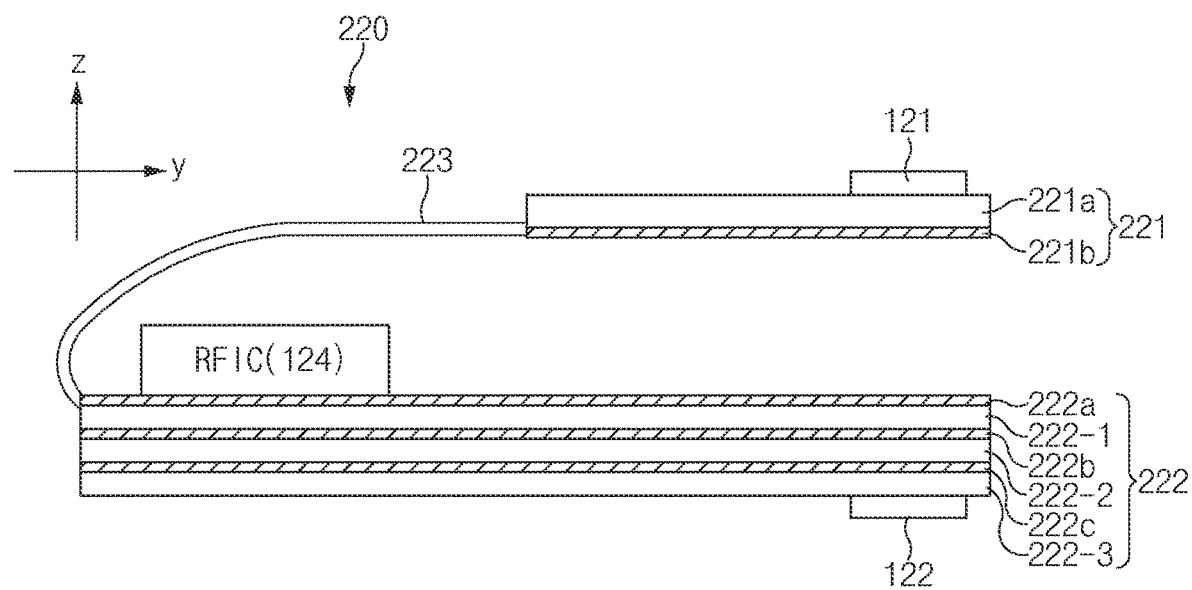
FIG. 2D illustrates a first antenna module according to another embodiment.
Figure 2E:
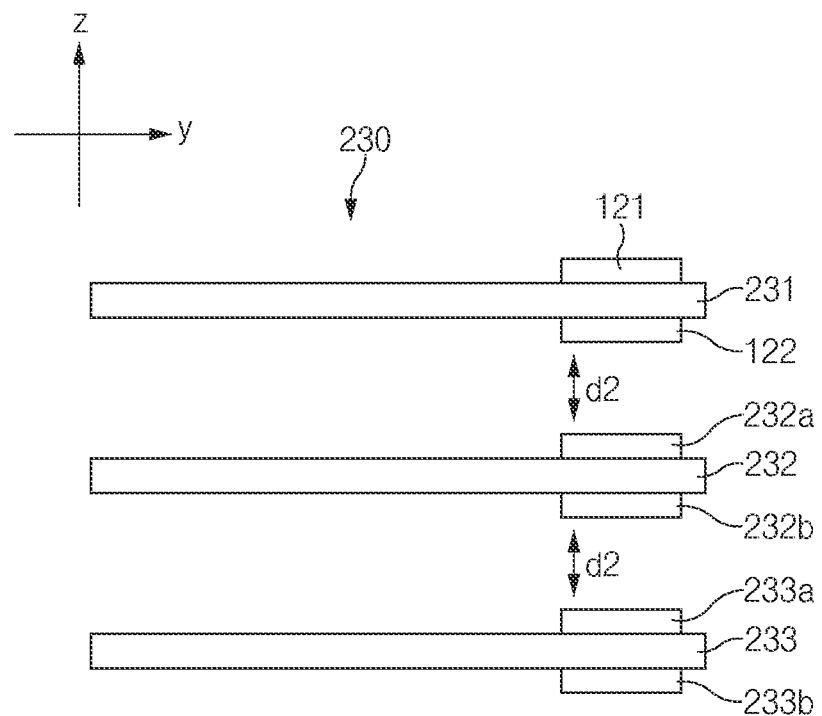
FIG. 2E illustrates a first antenna module according to another embodiment.

FIG. 2C illustrates a first antenna module according to another embodiment. FIGS. 2C to 2E described below are diagrams related to various types of a first antenna module that may be included in the electronic device 100.

Referring to FIG. 2C, a first antenna module 210 may include at least one of the first antenna array 121, the second antenna array 122, the communication circuit 124, a first printed circuit board 211, or a second printed circuit board 212. The first antenna array 121 and the second antenna array 122 may be respectively arranged on the first printed circuit board 211 and the second printed circuit board 212. The communication circuit 124 may be arranged between the first printed circuit board 211 and the second printed circuit board 212.

According to an embodiment, the first printed circuit board 211 may include a first non-conductive layer 211-1, a second non-conductive layer 211-2, and a first ground layer 211a arranged between the first non-conductive layer 211-1 and the second non-conductive layer 211-2. For example, the first antenna array 121 may be arranged on the first non-conductive layer 211-1.

According to an embodiment, the second printed circuit board 212 may include a third non-conductive layer 212-1, a fourth non-conductive layer 212-2, and a second ground layer 212a arranged between the third non-conductive layer 212-1 and the fourth non-conductive layer 212-2. For example, the second antenna array 122 may be arranged on the fourth non-conductive layer 212-2.

According to an embodiment, the communication circuit 124 may change a direction of a signal to be transmitted/received by changing a phase of current fed to the first antenna array 121 and the second antenna array 122. For example, the communication circuit 124 may transmit and/or receive a signal in a direction to the external device 10 (e.g., a base station) by changing the phase of current fed to the first antenna array 121 and the second antenna array 122.

According to an embodiment, a signal transmission/reception rate of the first antenna module 210 may vary according to a distance d1 between the first printed circuit board 211 and the second printed circuit board 212. For example, the signal transmission/reception rate of the first antenna module 210 may be at a certain level or higher when the distance d1 between the first printed circuit board 211 and the second printed circuit board 212 has at least a specified value.

FIG. 2D illustrates a first antenna module according to another embodiment.

Referring to FIG. 2D, a first antenna module 220 may include at least one of the first antenna array 121, the second antenna array 122, the communication circuit 124, a sub PCB 221, or a main PCB 222. The first antenna array 121 and the second antenna array 122 may be respectively arranged on the sub PCB 221 and the main PCB 222. The communication circuit 124 may be arranged on the main PCB 222.

According to an embodiment, the sub PCB 221 and the main PCB 222 may be connected via a connection member 223. The connection member 223 may be a coaxial cable or a flexible-printed circuit board (F-PCB). According to an embodiment, the first antenna array 121 on the sub PCB 221 may be electrically connected to the communication circuit 124 on the PCB 222 via the connection member 223.

According to an embodiment, the sub PCB 221 may include at least one ground layer 221b and at least one non-conductive layer 221a arranged on the ground layer 221b. The first antenna array 121 may be arranged on the non-conductive layer 221a.

According to an embodiment, the main PCB 222 may include a plurality of layers 222a, 222b, 222c, 222-1, 222-2, and 222-3. A portion of the plurality of layers 222a, 222b, 222c, 222-1, 222-2, and 222-3 may correspond to non-conductive layers 222-1, 222-2, and 222-3, and the other portion may correspond to ground layers 222a, 222b, and 222c. According to an embodiment, the non-conductive layers 222-1, 222-2, and 222-3 and the ground layers 222a, 222b, and 222c may be alternately stacked. For example, these layers may be stacked in the order of a first ground layer 222a, a first non-conductive layer 222-1, a second ground layer 222b, a second non-conductive layer 222-2, a third ground layer 222c, and a third non-conductive layer 222-3. The second antenna array 122 may be arranged on the third non-conductive layer 222-3.

The communication circuit 124 may change a direction of a signal to be transmitted/received by changing the phase of current fed to the first antenna array 121 and the second antenna array 122. For example, the communication circuit 124 may transmit and/or receive a signal in a direction to the external device 10 (e.g., a base station) by changing the phase of current fed to the first antenna array 121 and the second antenna array 122.

FIG. 2E illustrates a first antenna module according to another embodiment.

Referring to FIG. 2E, a first antenna module 230 may include at least one of a first printed circuit board 231, a second printed circuit board 232, a third printed circuit board 233, the first antenna array 121, the second antenna array 122, a third antenna array 232a, a fourth antenna array 232b, a fifth antenna array 233a, or a sixth antenna array 233b.

According to an embodiment, the first printed circuit board 231, the second printed circuit board 232, and the third printed circuit board 233 may be spaced a specified distance d2 apart. For example, the first printed circuit board 231 and the second printed circuit board 232 may be spaced the specified distance d2 apart, and the second printed circuit board 232 and the third printed circuit board 233 may be spaced the specified distance d2 apart.

The antenna arrays 121, 122, 232a, 232b, 233a, and 233b may be arranged on each of the printed circuit board 231, 232, and 233. For example, the first antenna array 121 may be arranged on one surface of the printed circuit board 231, and the second antenna array 122 may be arranged on another surface of the first printed circuit board 231. The third antenna array 232a may be arranged on one surface of the second printed circuit board 232, and the fourth antenna array 232b may be arranged on another surface of the second printed circuit board 232. The fifth antenna array 233a may be arranged on one surface of the third printed circuit board 233, and the sixth antenna array 233b may be arranged on another surface of the third printed circuit board 233.

According to an embodiment, the electronic device 100 may change a direction of a signal to be transmitted/received by changing the phase of current fed to the first antenna array 121 to the sixth antenna array 233b. For example, the electronic device 100 may transmit and/or receive a signal in a direction to the external device 10 (e.g., a base station) by changing the phase of current fed to the first antenna array 121 to the sixth antenna array 233b.

According to an embodiment, the signal transmission/reception rate of the first antenna module 230 may vary according to the distance d2 between the antenna arrays. For example, the signal transmission/reception rate of the first antenna module 230 may be at a certain level or higher when the distance d2 between the second antenna array 122 and the third antenna array 232a has at least a specified value.

Figure 3:
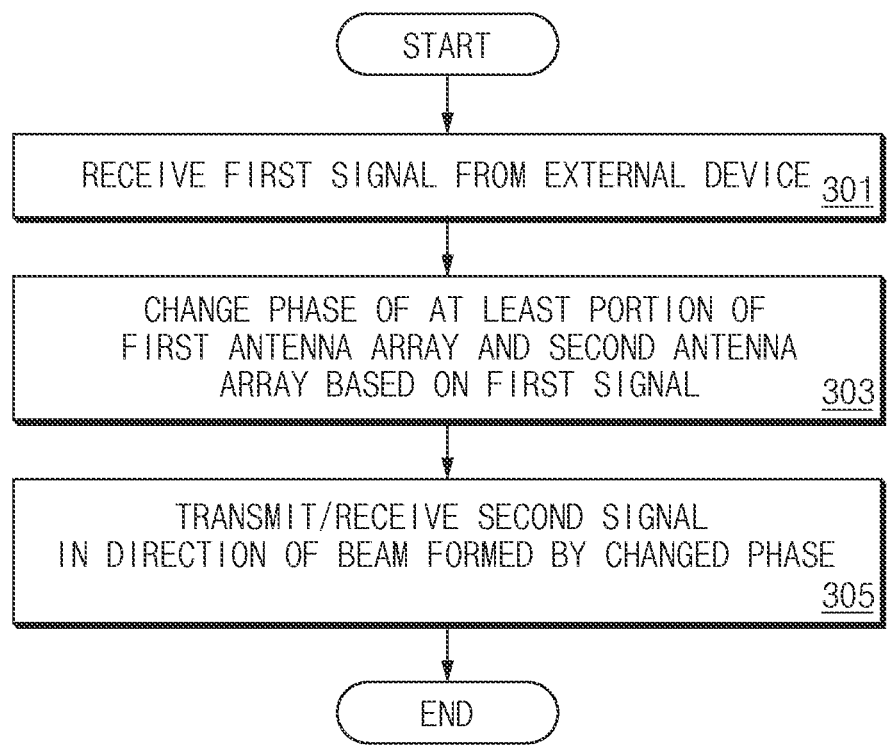
FIG. 3 is a flowchart illustrating operation of an electronic device according to an embodiment.

FIG. 3 is a flowchart illustrating operation of an electronic device according to an embodiment. FIG. 3 is a flowchart illustrating operation of the electronic device 100 illustrated in FIG. 1.

Referring to FIG. 3, the electronic device 100 may receive a first signal from the external device 10 (e.g., a base station) in operation 301. The electronic device 100 may set, based on the first signal, an optimum direction among directions in which signals may be transmitted/received. For example, when the external device 10 (e.g., a base station) is present in the z direction with respect to the electronic device 100, the electronic device 100 may set the z direction as the optimum direction for transmitting/receiving signals.

The above direction setting method is merely illustrative, and embodiments of the present invention are not limited to the above direction setting method. For example, the electronic device 100 may set the optimum direction for transmitting/receiving signals regardless of a location of the external device 10 (e.g., a base station).

In operation 303, the electronic device 100 may change the phase of at least a portion of the first antenna array 121 and the second antenna array 122. For example, when the z direction is set as the optimum direction, the electronic device 100 may apply currents having substantially the same phase to the first antenna array 121 and the second antenna array 122. For another example, when the y direction is set as the optimum direction, the electronic device 100 may apply currents having different phases (e.g., 180°) to the first antenna array 121 and the second antenna array 122.

In operation 305, the electronic device 100 may transmit and/or receive a second signal in a beam direction formed due to a changed phase. For example, when currents having substantially the same phase are applied to the first antenna array 121 and the second antenna array 122, a beam may be formed in the z direction. In this case, the electronic device 100 may transmit and/or receive a signal of a specified frequency band (e.g., 3 GHz to 100 GHz) in the z direction.

For another example, when currents having different phases (e.g., 180°) are applied to the first antenna array 121 and the second antenna array 122, a beam may be formed in the y direction. In this case, the electronic device 100 may transmit and/or receive a signal of a specified frequency band (e.g., 3 GHz to 100 GHz) in they direction.

In the present disclosure, a beam formed in the z direction may be referred to as a broad-side beam, and a beam formed in the y direction may be referred to as an end-fire beam.

Figure 4A:
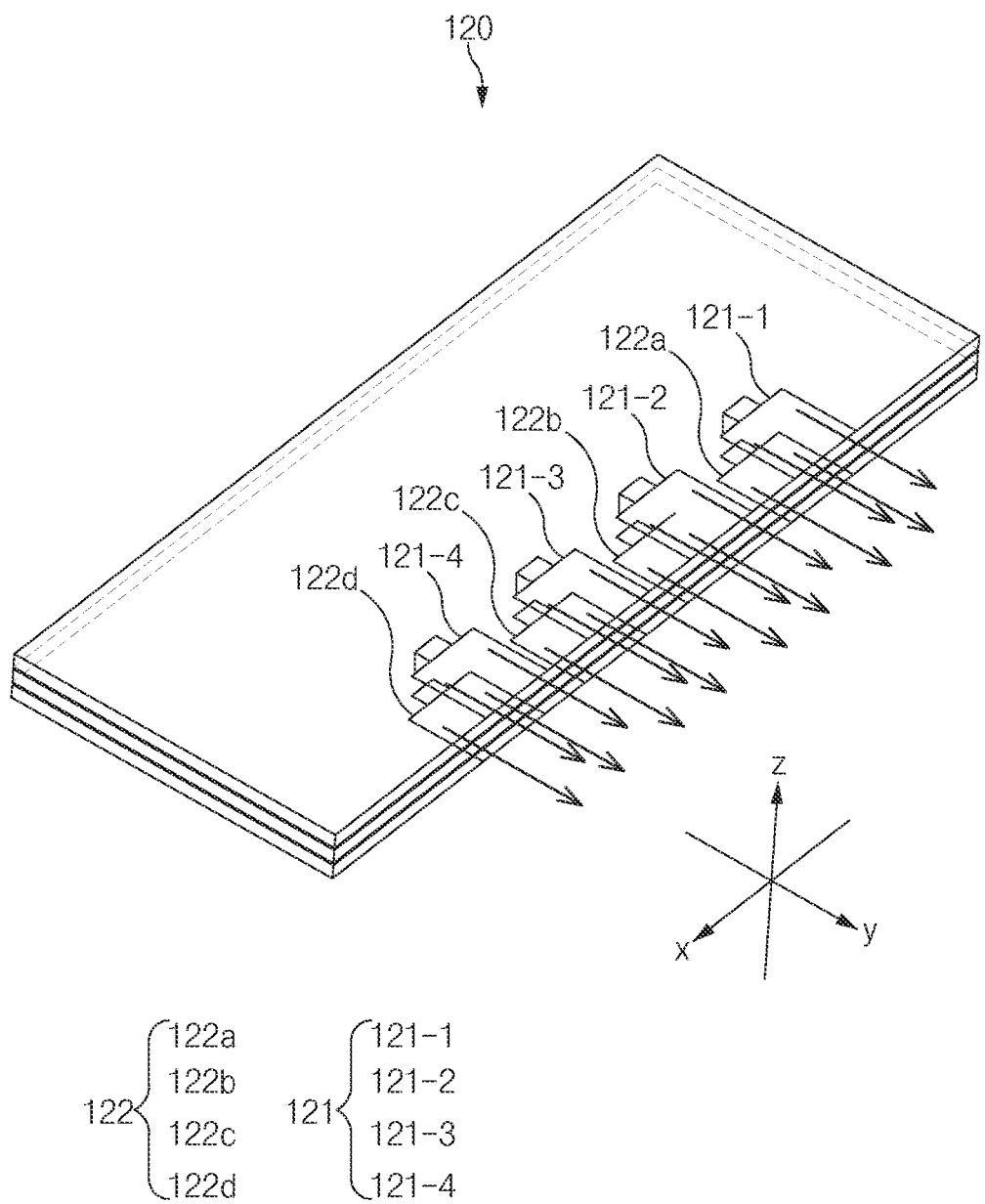
FIG. 4A illustrates a flow of surface radiation current applied to a first antenna module according to an embodiment.
Figure 4B:
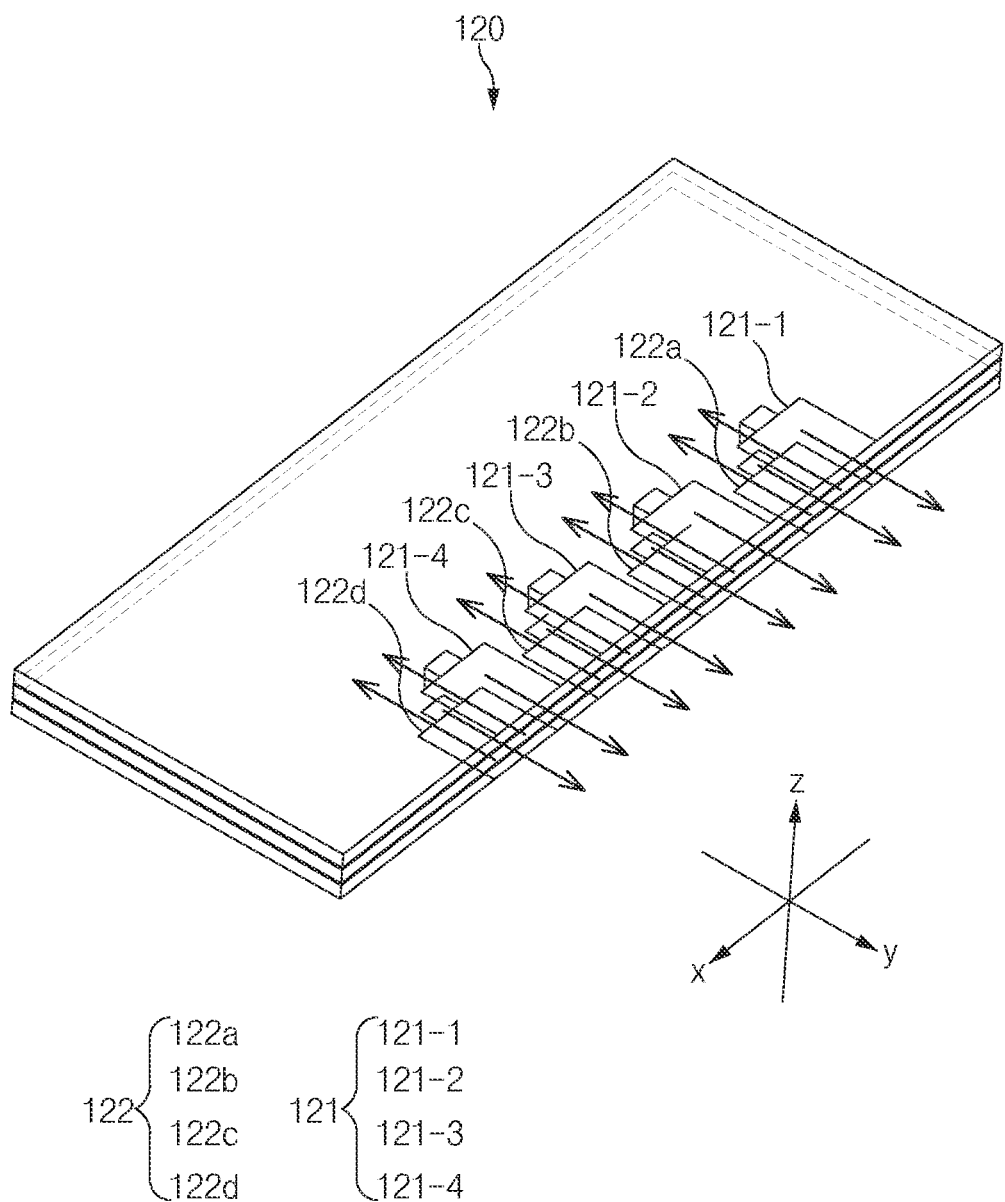
FIG. 4B illustrates a flow of surface radiation current applied to a first antenna module according to another embodiment.

FIG. 4A illustrates a flow of surface radiation current applied to a first antenna module according to an embodiment. FIG. 4B illustrates a flow of surface radiation current applied to a first antenna module according to another embodiment.

Referring to FIG. 4A, the communication circuit 124 may apply currents having substantially the same phase to the first antenna array 121 and the second antenna array 122. According to an embodiment, FIG. 4A is a diagram related to an example in which a phase difference between the first antenna array 121 and the second antenna array 122 is 0° or an example in which currents having the same phase are applied to the first antenna array 121 and the second antenna array 122. For example, phase differences between currents applied to a first patch antenna 121-1 and a patch antenna 'a' 122a, currents applied to a second patch antenna 121-2 and a patch antenna 'b' 122b, currents applied to a third patch antenna 121-3 and a patch antenna 'c' 122c, and currents applied to a fourth patch antenna 121-4 and a patch antenna 'd' 122d may be 0°.

In an embodiment, the communication circuit 124 may apply a current having a phase of 0° to the first patch antenna 121-1, the second patch antenna 121-2, the third patch antenna 121-3, and the fourth patch antenna 121-4. Furthermore, the communication circuit 124 may apply a current having a phase of 0° to the patch antenna 'a' 122a, the patch antenna 'b' 122b, the patch antenna 'c' 122c, and the patch antenna 'd' 122d. When the currents having substantially the same phase are applied to the first to fourth patch antennas 121-1 to 121-4 and the patch antenna 'a' 122a to the patch antenna 'd' 122d, the currents may flow in the y direction as illustrated in FIG. 4A.

Referring to FIG. 4B, the communication circuit 124 may apply currents having different phases to the first antenna array 121 and the second antenna array 122. According to an embodiment, FIG. 4B is a diagram related to an example in which a phase difference between the first antenna array 121 and the second antenna array 122 is 180° or an example in which currents having opposite phases are applied to the first antenna array 121 and the second antenna array 122. For example, the phase differences between currents applied to the first patch antenna 121-1 and the patch antenna 'a' 122a, currents applied to the second patch antenna 121-2 and the patch antenna 'b' 122b, currents applied to the third patch antenna 121-3 and the patch antenna 'c' 122c, and currents applied to the fourth patch antenna 121-4 and the patch antenna 'd' 122d may be 180°.

In an embodiment, the communication circuit 124 may apply a current having a phase of 0° to the first patch antenna 121-1, the second patch antenna 121-2, the third patch antenna 121-3, and the fourth patch antenna 121-4. Furthermore, the communication circuit 124 may apply a current having a phase of 180° to the patch antenna 'a' 122a, the patch antenna 'b' 122b, the patch antenna 'c' 122c, and the patch antenna 'd' 122d. When currents having different phases are applied to the first antenna array 121 and the second antenna array 122, the currents may flow in the y direction in the first antenna array 121 and may flow in a −y direction in the second antenna array 122 as illustrated in FIG. 4B.

Figure 5:
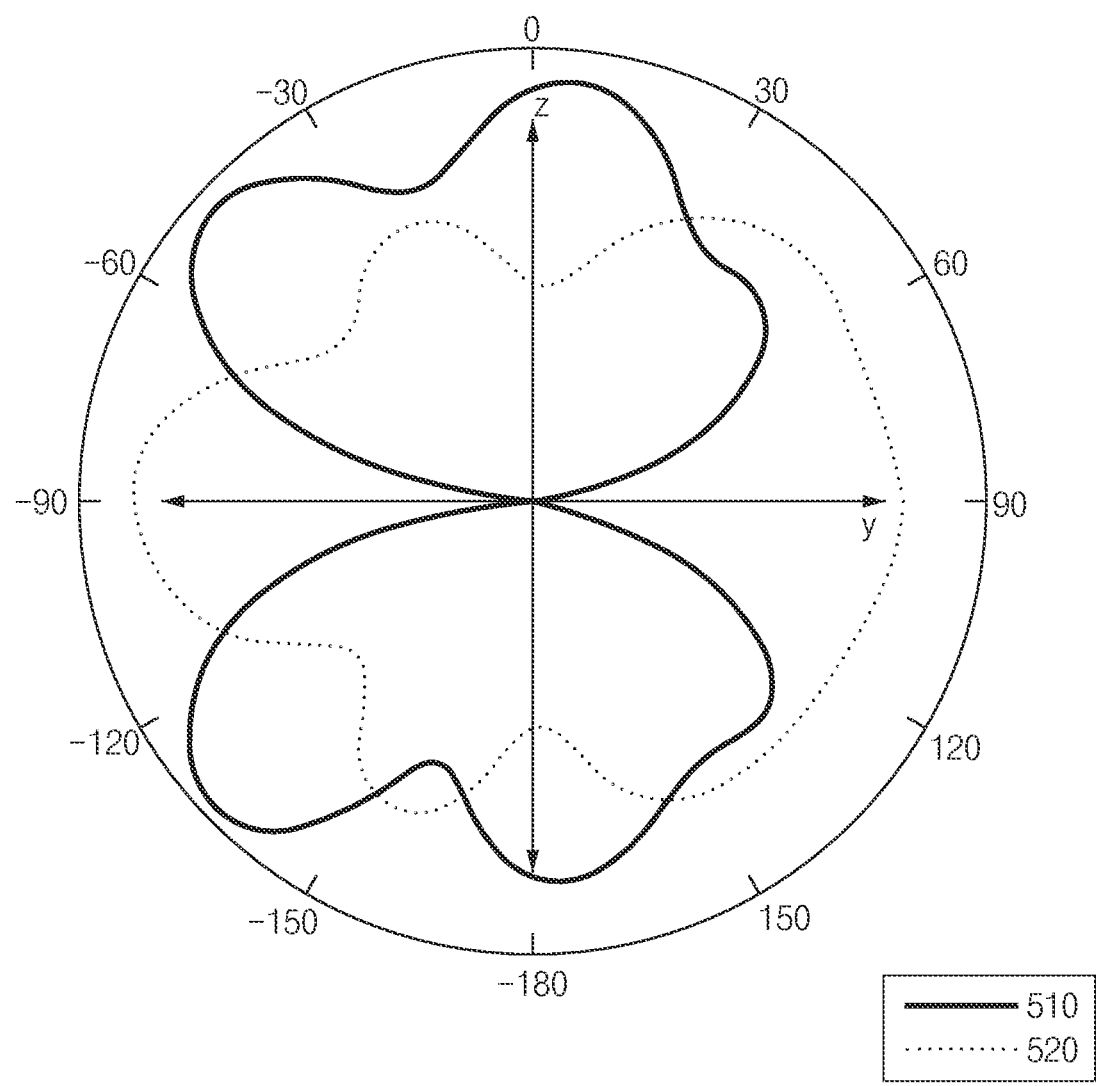
FIG. 5 illustrates beams formed by a first antenna module when currents having substantially the same phase or having different phases are applied to a first antenna array and a second antenna array according to an embodiment.

FIG. 5 illustrates beams formed by a first antenna module when currents having substantially the same phase or having different phases are applied to a first antenna array and a second antenna array according to an embodiment.

Referring to FIG. 5, when the communication circuit 124 applies currents having substantially the same phase to the first antenna array 121 and the second antenna array 122, a first beam 510 may be formed by the first antenna module 120. For example, when the communication circuit 124 applies currents having substantially the same phase to the first antenna array 121 and the second antenna array 122, the communication circuit 124 may transmit/receive a signal in the z direction and in a −z direction, and the first beam 510 may be formed. In the present disclosure, the first beam 510 may refer to a "beam formed in a direction perpendicular to the first antenna array 121 or a direction in which the first antenna array 121 is oriented".

For another example, when the communication circuit 124 applies currents having different phases (e.g., 180°) to the first antenna array 121 and the second antenna array 122, a second beam 520 may be formed by the first antenna module 120. That is, when the communication circuit 124 applies currents having different phases (e.g., 180°) to the first antenna array 121 and the second antenna array 122, the communication circuit 124 may transmit/receive a signal in the y direction, and the second beam 520 may be formed. In the present disclosure, the second beam 520 may refer to a "beam formed in a direction parallel to the first antenna array 121 or a direction perpendicular to the direction in which the first antenna array 121 is oriented".

Figure 6A:
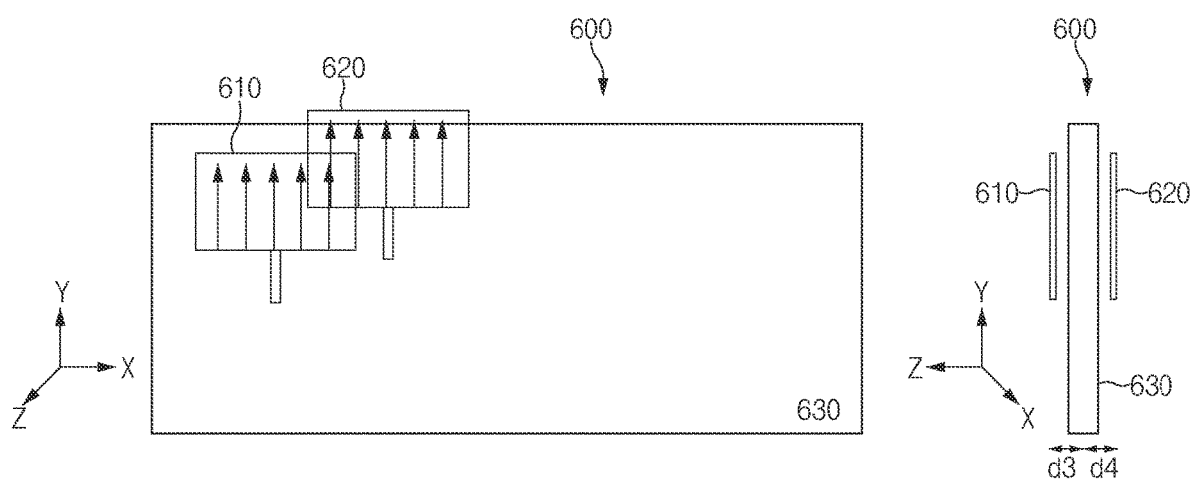
FIG. 6A is a simplified view of an antenna module according to an embodiment.
Figure 6B:
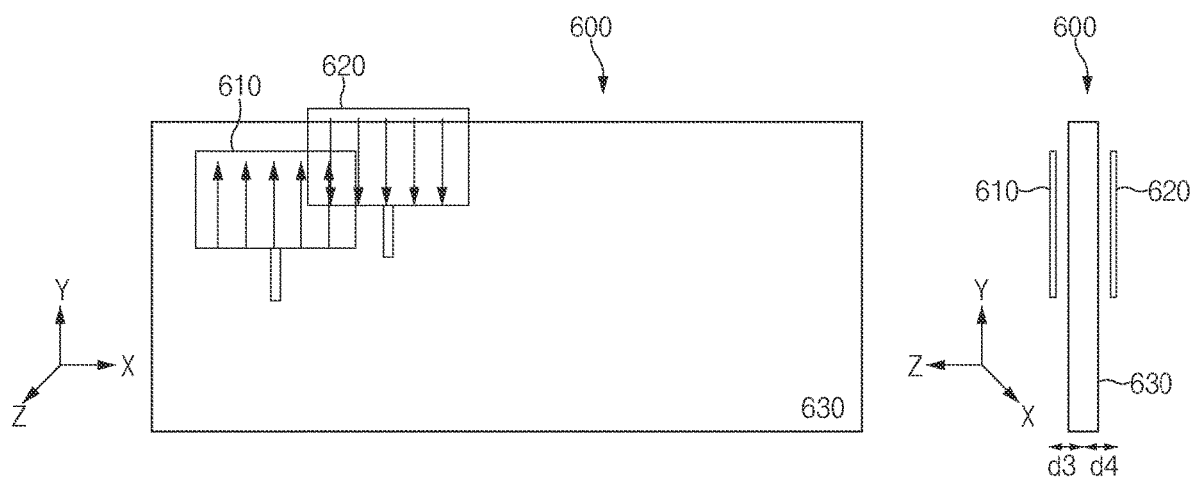
FIG. 6B is a simplified view of an antenna module according to another embodiment.

FIG. 6A is a simplified view of an antenna module according to an embodiment. FIG. 6B is a simplified view of an antenna module according to another embodiment.

Referring to FIGS. 6A and 6B, an antenna module 600 may include a first patch antenna 610, a second patch antenna 620, and a ground layer 630. The first patch antenna 610 may be arranged on the ground layer 630 in the z direction, and the second patch antenna 620 may be arranged on the ground layer 630 in the −z direction. The first patch antenna 610 and the ground layer 630 may have a first separation distance d3, and the second patch antenna 620 and the ground layer 630 may have a second separation distance d4.

In the case of FIG. 6A, the communication circuit 124 may apply currents having substantially the same phase to the first patch antenna 610 and the second patch antenna 620. For example, FIG. 6A may be a diagram related to an example in which a phase difference between currents applied to the first patch antenna 610 and the second patch antenna 620 is 0° or an example in which currents having the same phase are applied to the first patch antenna 610 and the second patch antenna 620. In an embodiment, the communication circuit 124 may apply currents having a phase of 0° to the first patch antenna 610 and the second patch antenna 620.

In the case of FIG. 6B, the communication circuit 124 may apply currents having different phases to the first patch antenna 610 and the second patch antenna 620. For example, FIG. 6B may be a diagram related to an example in which a phase difference between currents applied to the first patch antenna 610 and the second patch antenna 620 is 180° or an example in which currents having opposite phases are applied to the first patch antenna 610 and the second patch antenna 620. In an embodiment, the communication circuit 124 may apply currents having a phase of 180° to the first patch antenna 610 and the second patch antenna 620.

Although the two patch antennas 610 and 620 are illustrated as being included in the antenna module 600 in FIGS. 6A and 6B, the embodiments described with reference to FIGS. 6A and 6B may also be applied to the case in which the antenna arrays 121 and 122 illustrated in FIG. 2A are included in the antenna module 600. For example, the communication circuit 124 may apply currents having the same phase or having different phases to the first antenna array 121 and the second antenna array 122 illustrated in FIG. 2A.

Figure 7A:
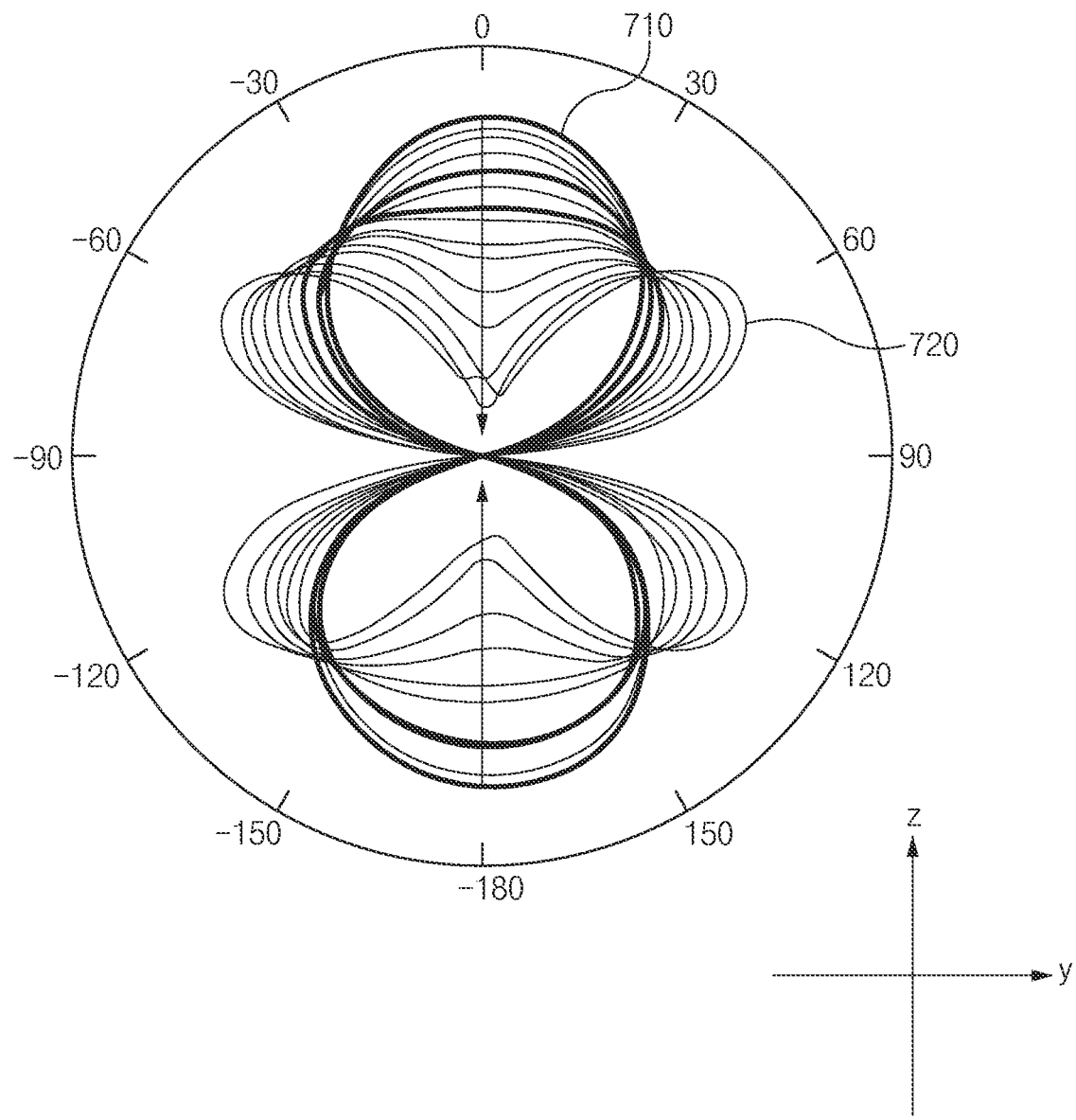
FIG. 7A illustrates beams formed by an antenna module when a separation distance between a first antenna array (and/or a second antenna array) and a first ground layer (and/or a second ground layer) according to an embodiment is gradually increased.

FIG. 7A illustrates beams formed by an antenna module when a separation distance between a ground layer and a first patch antenna (and/or a second patch antenna) according to an embodiment is gradually increased. FIG. 7A illustrates beams formed by the antenna module 600 when the first separation distance d3 and/or the second separation distance d4 illustrated in FIG. 6A is gradually increased.

Figure 7B:
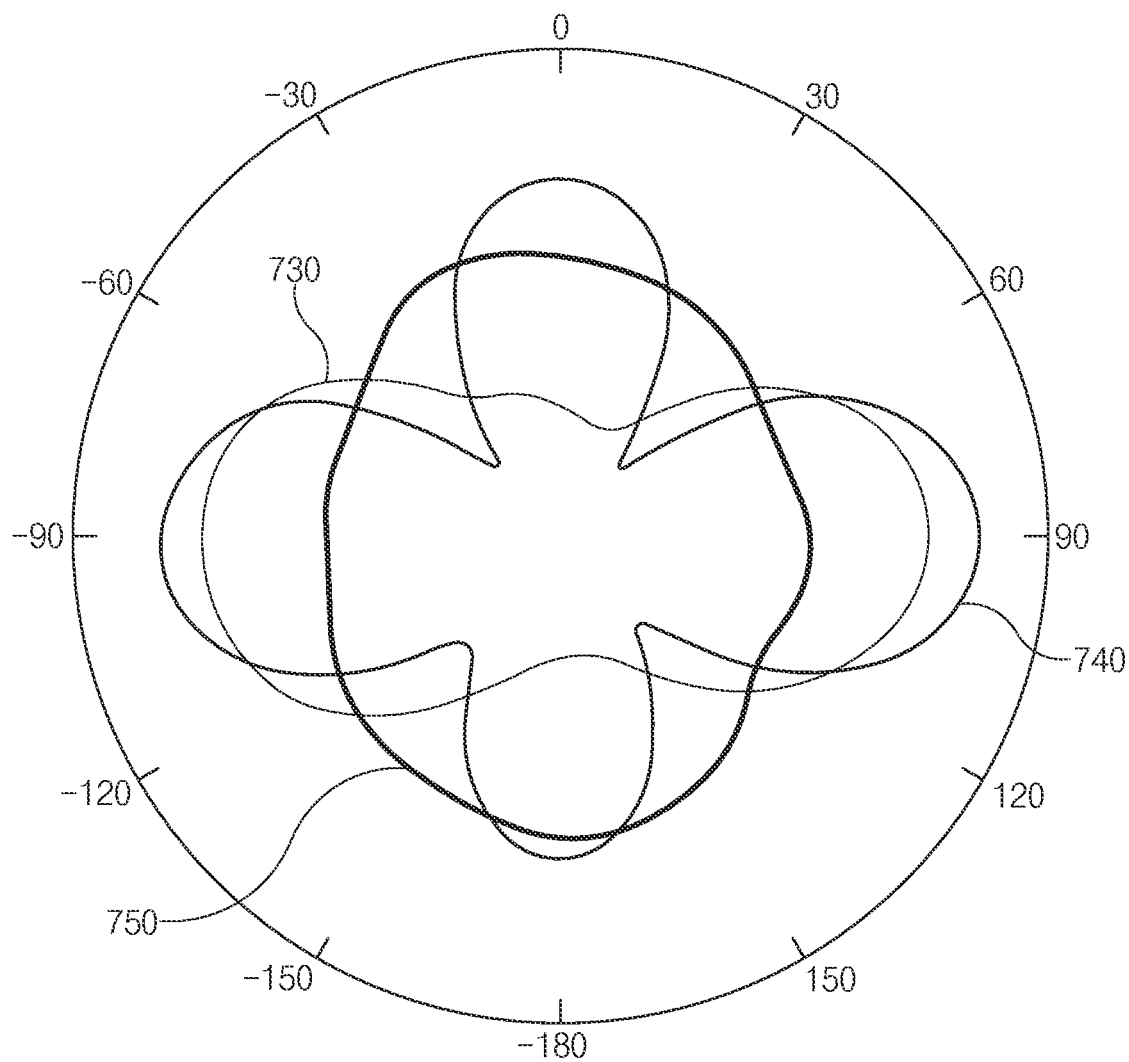
FIG. 7B illustrates beams formed by an antenna module when a separation distance between a first antenna array (and/or a second antenna array) and a first ground layer (and/or a second ground layer) according to another embodiment is gradually increased.

FIG. 7B illustrates beams formed by an antenna module when a separation distance between a ground layer and a first patch antenna (and/or a second patch antenna) according to another embodiment is gradually increased. FIG. 7B illustrates beams formed by the antenna module 600 when the first separation distance d3 and/or the second separation distance d4 illustrated in FIG. 6B is gradually increased.

Referring to FIG. 7A, the first patch antenna 610 may be spaced apart from the ground layer 630 in the z direction. The graphs 710 and 720 illustrated in FIG. 7A show beams formed by the antenna module 600 when currents having substantially the same phase are applied to the first patch antenna 610 and the second patch antenna 620, and the first patch antenna 610 and/or the second patch antenna 620 is gradually spaced apart from the ground layer 630 in the z direction and/or −z direction. For example, the beams illustrated in FIG. 7A may be formed when the first patch antenna 610 and/or the second patch antenna 620 is gradually spaced apart from the ground layer 630 by a distance of about 0.1 mm to about 4.6 mm in the z direction and/or −z direction.

The graph 710 shows a beam formed by the antenna module 600 when the separation distance between the first patch antenna 610 and/or the second patch antenna 620 and the ground layer 630 is about 0.1 mm. The graph 720 shows a beam formed by the antenna module 600 when the separation distance between the first patch antenna 610 and/or the second patch antenna 620 and the ground layer 630 is about 4.6 mm. As illustrated in FIG. 7A, as the separation distance between the first patch antenna 610 and/or the second patch antenna 620 and the ground layer 630 increases, a beam shape which is convex in the z direction and in the −z direction may gradually become concave. Furthermore, as the separation distance between the first patch antenna 610 and/or the second patch antenna 620 and the ground layer 630 increases, the performance of radiation in the z direction and −z direction may reduce, and the performance of radiation in the y direction and −y direction may increase.

Referring to FIG. 7B, the first patch antenna 610 and/or the second patch antenna 620 may be spaced apart from the ground layer 630 in the z direction and/or −z direction. The graphs 730, 740, and 750 illustrated in FIG. 7B show beams formed by the antenna module 600 when currents having different phases (e.g., 180°) are applied to the first patch antenna 610 and the second patch antenna 620, and the first patch antenna 610 and/or the second patch antenna 620 is gradually spaced apart from the ground layer 630 in the z direction and/or −z direction. For example, the beams illustrated in FIG. 7B may be formed when the first patch antenna 610 and/or the second patch antenna 620 is gradually spaced apart from the ground layer 630 by a distance of about 2.5 mm to about 4 mm in the z direction and/or −z direction.

The graph 730 shows a beam formed by the antenna module 600 when the separation distance between the first patch antenna 610 and/or the second patch antenna 620 and the ground layer 630 is about 2.5 mm. The graph 740 shows a beam formed by the antenna module 600 when the separation distance between the first patch antenna 610 and/or the second patch antenna 620 and the ground layer 630 is about 4 mm. The graph 750 shows a beam formed by the antenna module 600 when the separation distance between the first patch antenna 610 and/or the second patch antenna 620 and the ground layer 630 is about 7 mm. As illustrated in FIG. 7B, as the separation distance between the first patch antenna 610 and/or the second patch antenna 620 and the ground layer 630 increases within the range of about 2.5 mm to about 4 mm, the beam shape may become more convex in the y direction and −y direction. For example, as the separation distance between the first patch antenna 610 and/or the second patch antenna 620 and the ground layer 630 increases within the range of about 2.5 mm to about 4 mm, the performance of radiation in the y direction and −y direction may improve.

According to an embodiment, as the separation distance between the first patch antenna 610 and/or the second patch antenna 620 and the ground layer 630 increases within the range of about 6 mm to about 8 mm, the beam shape may be closer to a circular shape. For example, as the separation distance between the first patch antenna 610 and/or the second patch antenna 620 and the ground layer 630 increases within the range of about 6 mm to about 8 mm, the performance of radiation in the y direction −y direction may deteriorate.

Figure 8A:
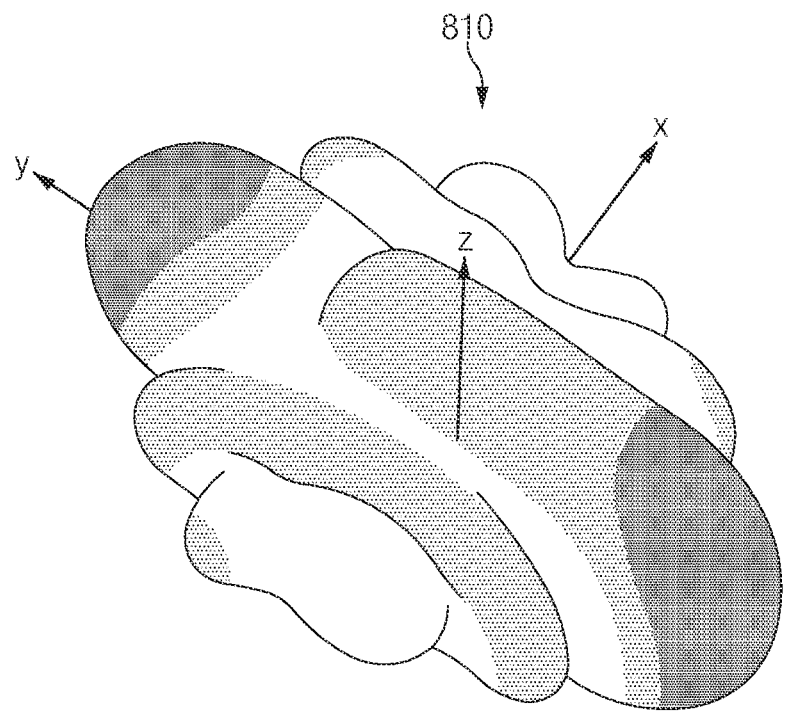
FIG. 8A illustrates adjustment of a beam on an x axis according to an embodiment.
Figure 8B:
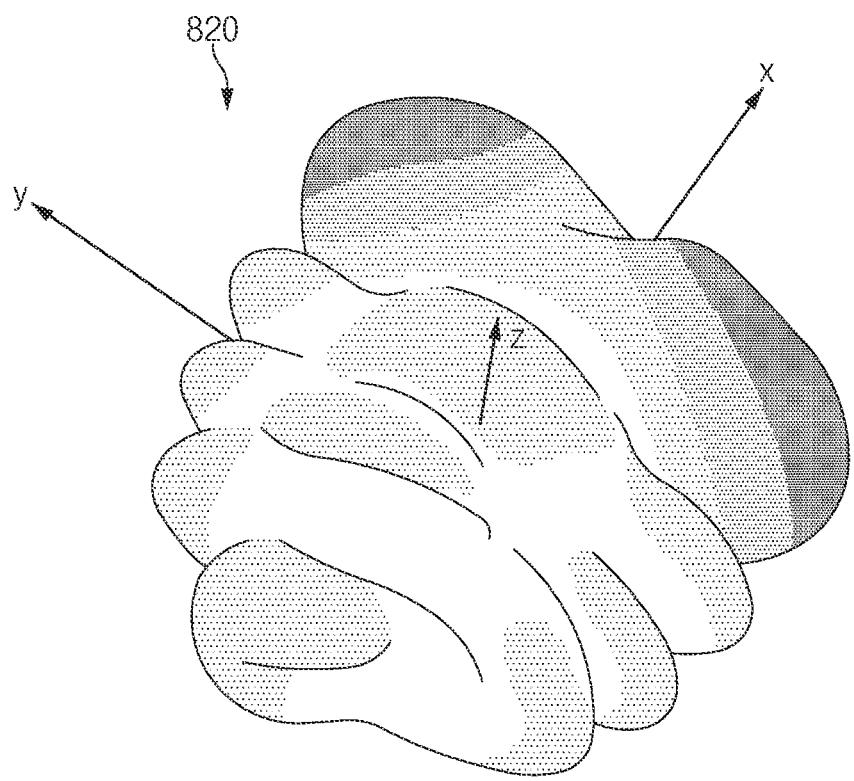
FIG. 8B illustrates adjustment of a beam on an x axis according to another embodiment.
Figure 8C:
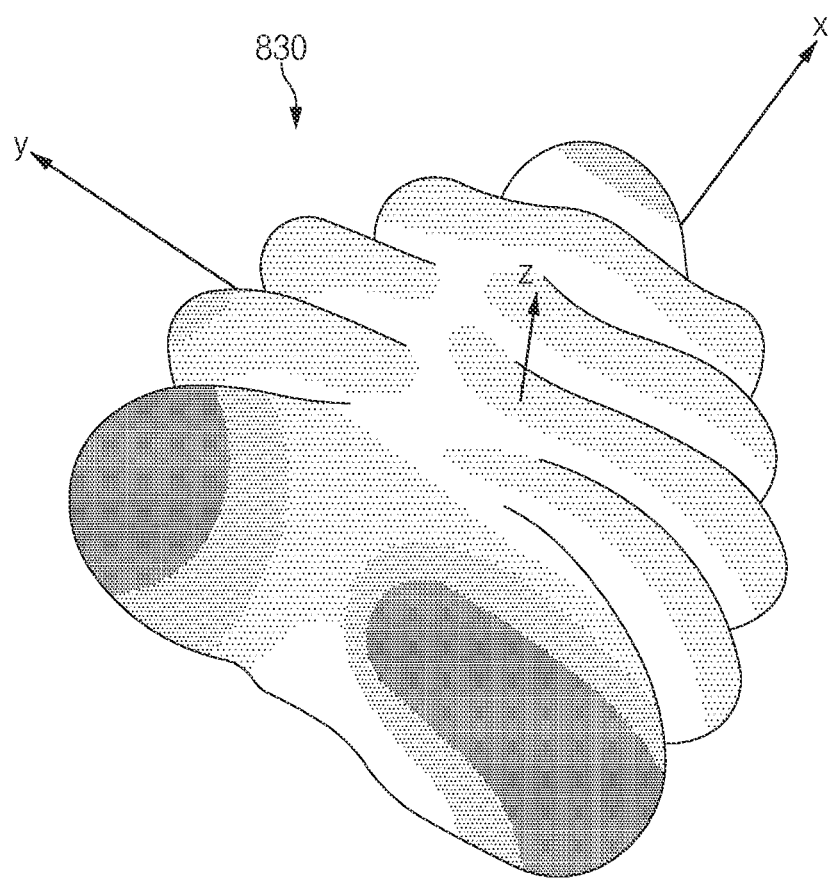
FIG. 8C illustrates adjustment of a beam on an x axis according to another embodiment.

FIG. 8A illustrates adjustment of a beam on an x axis according to an embodiment. FIG. 8B illustrates adjustment of a beam on an x axis according to another embodiment. FIG. 8C illustrates adjustment of a beam on an x axis according to another embodiment.

Referring to FIG. 8A, currents having different phases may be applied to the first antenna array 121 and the second antenna array 122. For example, currents having the phases shown in the following <table 1> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 810 may be formed by currents having the phases shown in the following <table 1>.

TABLE 1

| | First patch antenna 121-1 | Second patch antenna 121-2 | Third patch antenna 121-3 | Fourth patch antenna 121-4 |
|---|---|---|---|---|
| Phase | 0° | 0° | 0° | 0° |
| | Patch antenna 'a' 121a | Patch antenna 'b' 121b | Patch antenna 'c' 121c | Patch antenna 'd' 121d |
| Phase | 180° | 180° | 180° | 180° |

In the case of the embodiment illustrated in FIG. 8A, since there is no phase difference between the first patch antenna 121-1 and the second patch antenna 121-2, between the second patch antenna 121-2 and the third patch antenna 121-3, and between the third patch antenna 121-3 and the fourth patch antenna 121-4 (or between the patch antenna 'a' 122a and the patch antenna 'b' 122b, between the patch antenna 'b' 122b and the patch antenna 'c' 122c, and between the patch antenna 'c' 122c and the patch antenna 'd' 122d), the rate of signal transmission/reception in the x axis direction and/or −x axis direction may be relatively low. On the contrary, the rate of signal transmission/reception in the y axis direction and/or −y axis direction.

Referring to FIG. 8B, currents having different phases may be applied to the first antenna array 121 and the second antenna array 122. For example, currents having the phases shown in the following <table 2> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 820 may be formed by currents having the phases shown in the following <table 2>.

TABLE 2

| | First patch antenna 121-1 | Second patch antenna 121-2 | Third patch antenna 121-3 | Fourth patch antenna 121-4 |
|---|---|---|---|---|
| Phase | 0° | 120° | 240° | 0° |
| | Patch antenna 'a' 121a | Patch antenna 'b' 121b | Patch antenna 'c' 121c | Patch antenna 'd' 121d |
| Phase | 180° | 300° | 60° | 180° |

In the case of the embodiment illustrated in FIG. 8B, since there is a phase difference between the first patch antenna 121-1 and the second patch antenna 121-2, between the second patch antenna 121-2 and the third patch antenna 121-3, and between the third patch antenna 121-3 and the fourth patch antenna 121-4 (or between the patch antenna 'a' 122a and the patch antenna 'b' 122b, between the patch antenna 'b' 122b and the patch antenna 'c' 122c, and between the patch antenna 'c' 122c and the patch antenna 'd' 122d), the rate of signal transmission/reception in the x axis direction may be relatively higher than that of the embodiment illustrated in FIG. 8A.

Referring to FIG. 8C, currents having different phases may be applied to the first antenna array 121 and the second antenna array 122. For example, currents having the phases shown in the following <table 3> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 830 may be formed by currents having the phases shown in the following <table 3>.

TABLE 3

| | First patch antenna 121-1 | Second patch antenna 121-2 | Third patch antenna 121-3 | Fourth patch antenna 121-4 |
|---|---|---|---|---|
| Phase | 0° | 240° | 120° | 0° |
| | Patch antenna 'a' 121a | Patch antenna 'b' 121b | Patch antenna 'c' 121c | Patch antenna 'd' 121d |
| Phase | 180° | 60° | 300° | 180° |

Figure 9A:
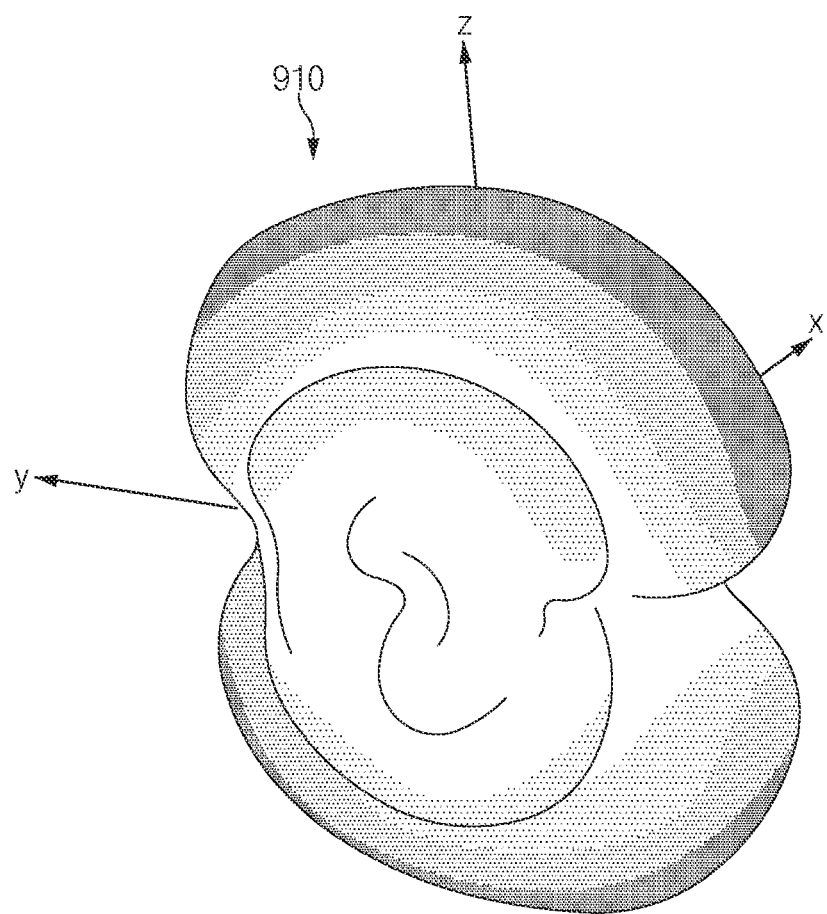
FIG. 9A illustrates adjustment of a beam on a z axis according to an embodiment.
Figure 9B:
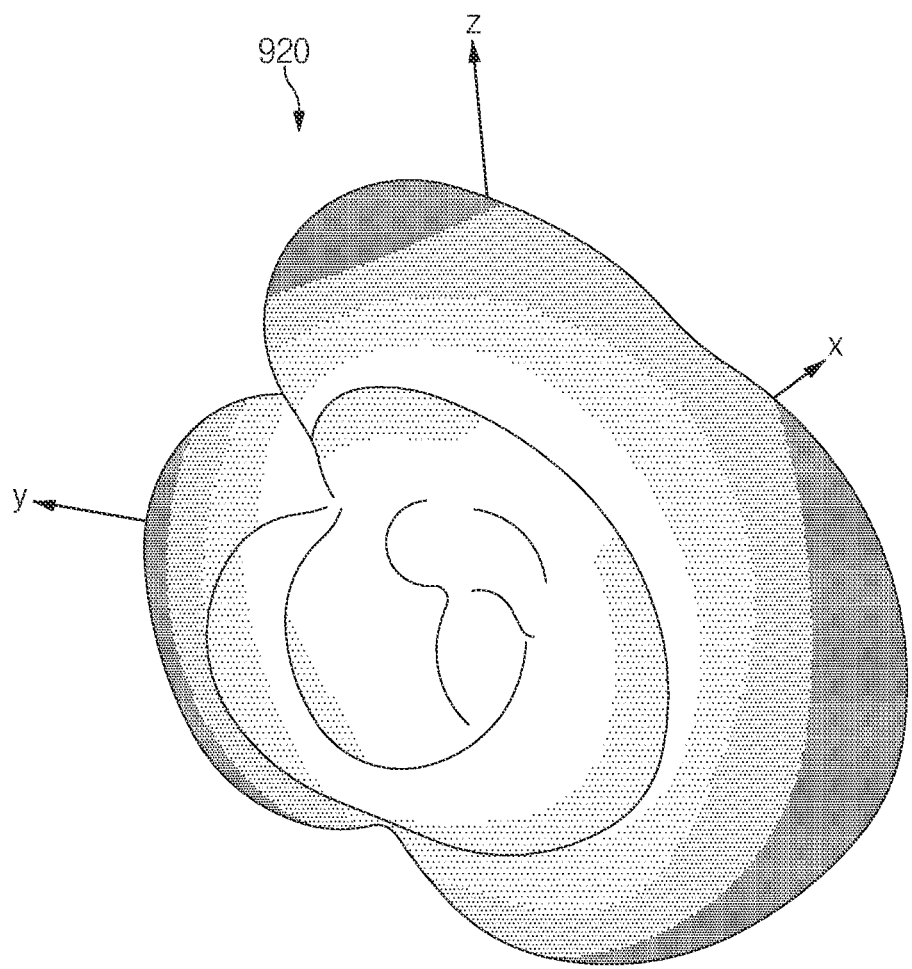
FIG. 9B illustrates adjustment of a beam on a z axis according to another embodiment.
Figure 9C:
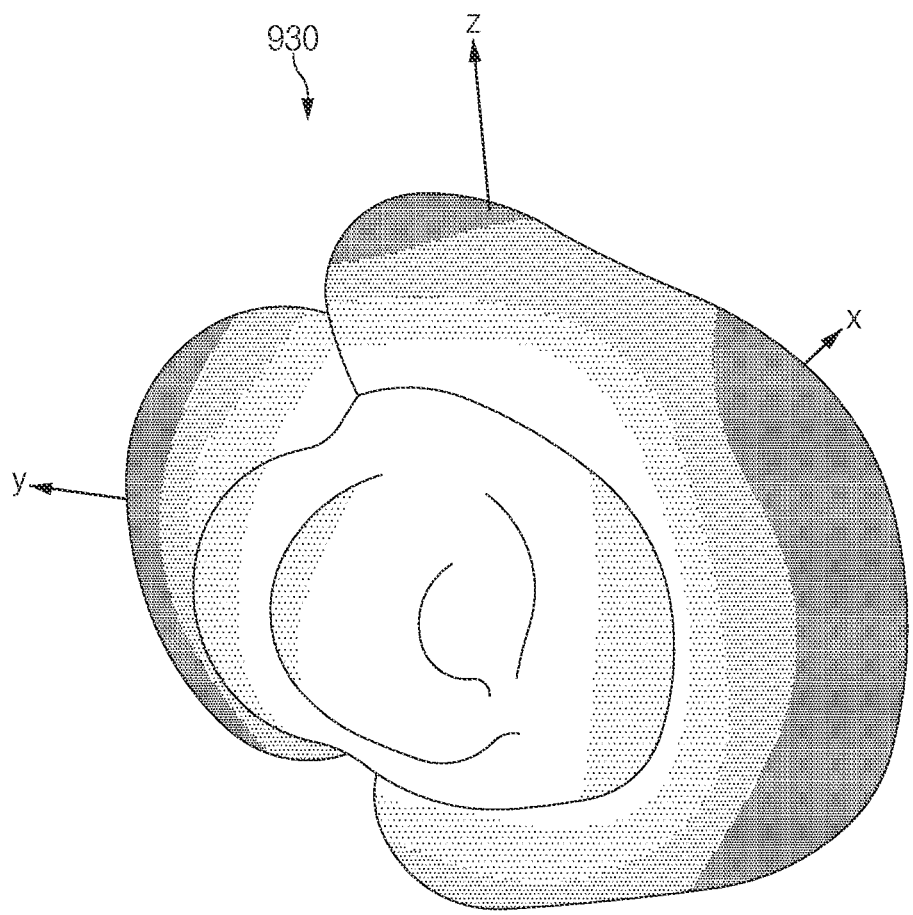
FIG. 9C illustrates adjustment of a beam on a z axis according to another embodiment.
Figure 9D:
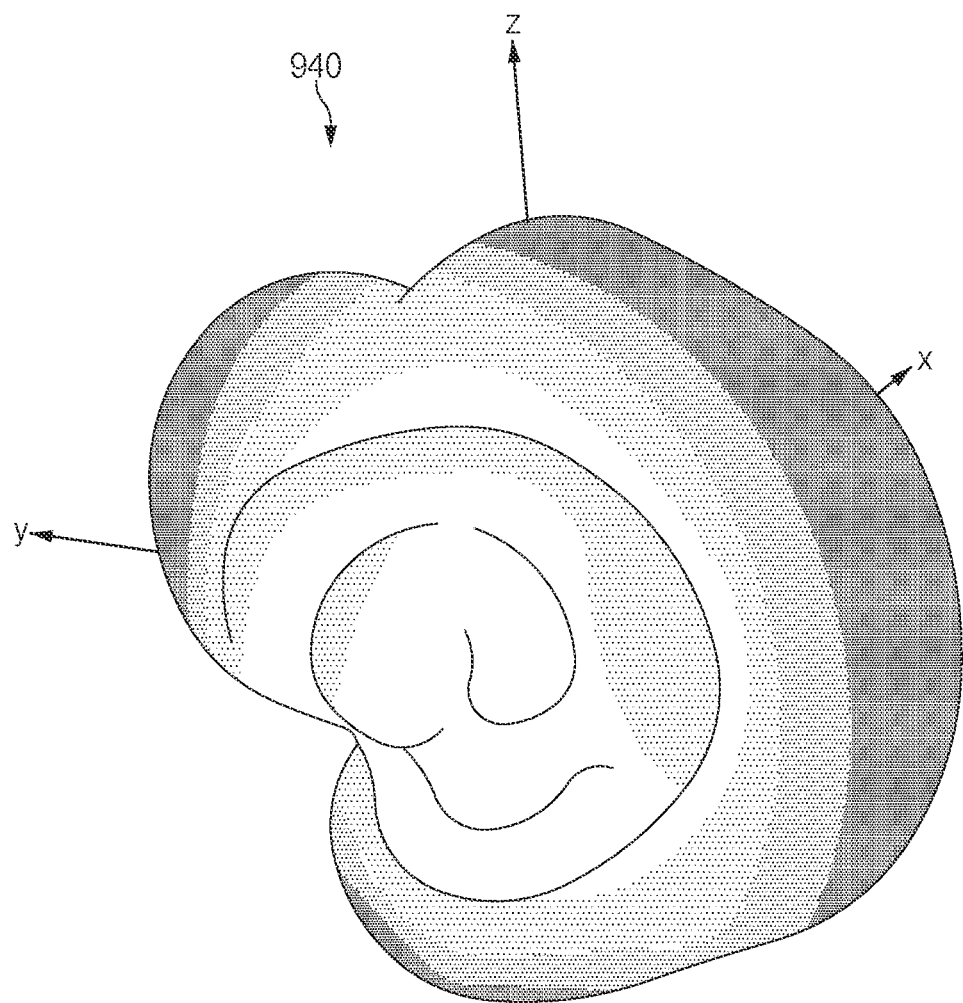
FIG. 9D illustrates adjustment of a beam on a z axis according to another embodiment.

In the case of the embodiment illustrated in FIG. 8C, since there is a phase difference between the first patch antenna 121-1 and the second patch antenna 121-2, between the second patch antenna 121-2 and the third patch antenna 121-3, and between the third patch antenna 121-3 and the fourth patch antenna 121-4 (or between the patch antenna 'a' 122a and the patch antenna 'b' 122b, between the patch antenna 'b' 122b and the patch antenna 'c' 122c, and between the patch antenna 'c' 122c and the patch antenna 'd' 122d), the rate of signal transmission/reception in the −x axis direction may be relatively higher than that of the embodiment illustrated in FIG. 8A. FIG. 9A illustrates adjustment of a beam on a z axis according to an embodiment. FIG. 9B illustrates adjustment of a beam on a z axis according to another embodiment. FIG. 9C illustrates adjustment of a beam on a z axis according to another embodiment. FIG. 9D illustrates adjustment of a beam on a z axis according to another embodiment.

Referring to FIG. 9A, currents having substantially the same phase may be applied to the first antenna array 121 and the second antenna array 122. For example, currents having the phases shown in the following <table 4> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 910 may be formed by currents having the phases shown in the following <table 4>.

TABLE 4

| | First patch antenna 121-1 | Second patch antenna 121-2 | Third patch antenna 121-3 | Fourth patch antenna 121-4 |
|---|---|---|---|---|
| Phase | 0° | 0° | 0° | 0° |
| | Patch antenna 'a' 121a | Patch antenna 'b' 121b | Patch antenna 'c' 121c | Patch antenna 'd' 121d |
| Phase | 0° | 0° | 0° | 0° |

In the case of the embodiment illustrated in FIG. 9A, since there is no phase difference between the first antenna array 121 and the second antenna array 122, the rate of signal transmission/reception in the z axis direction and/or −z axis direction may be high. For example, the rate of signal transmission/reception in the z axis direction and/or −z axis direction may be significantly higher than the rate of signal transmission/reception in other directions.

Referring to FIG. 9B, currents having different phases may be applied to the first antenna array 121 and the second antenna array 122. For example, currents having the phases shown in the following <table 5> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 920 may be formed by currents having the phases shown in the following <table 5>.

TABLE 5

| | First patch antenna 121-1 | Second patch antenna 121-2 | Third patch antenna 121-3 | Fourth patch antenna 121-4 |
|---|---|---|---|---|
| Phase | 0° | 0° | 0° | 0° |
| | Patch antenna 'a' 121a | Patch antenna 'b' 121b | Patch antenna 'c' 121c | Patch antenna 'd' 121d |
| Phase | 100° | 100° | 100° | 100° |

In the case of the embodiment illustrated in FIG. 9B, since there is a phase difference between the first antenna array 121 and the second antenna array 122, the rate of signal transmission/reception in the z axis direction and/or −z axis direction may be relatively lower than that of the embodiment illustrated in FIG. 9A. On the contrary, the rate of signal transmission/reception in the y axis direction and/or −y axis direction may be relatively higher than that of the embodiment illustrated in FIG. 9A. Referring to FIG. 9C, currents having different phases may be applied to the first antenna array 121 and the second antenna array 122. For example, currents having the phases shown in the following <table 6> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 930 may be formed by currents having the phases shown in the following <table 6>.

TABLE 6

| | First patch antenna 121-1 | Second patch antenna 121-2 | Third patch antenna 121-3 | Fourth patch antenna 121-4 |
|---|---|---|---|---|
| Phase | 0° | 0° | 0° | 0° |

| | Patch antenna 'a' 121a | Patch antenna 'b' 121b | Patch antenna 'c' 121c | Patch antenna 'd' 121d |
|---|---|---|---|---|
| Phase | 180° | 180° | 180° | 180° |

In the case of the embodiment illustrated in FIG. 9C, since there is a phase difference between the first antenna array 121 and the second antenna array 122, the rate of signal transmission/reception in the z axis direction and/or −z axis direction may be relatively lower than that of the embodiment illustrated in FIG. 9A. On the contrary, the rate of signal transmission/reception in the y axis direction and/or −y axis direction may be relatively higher than that of the embodiment illustrated in FIG. 9A. Referring to FIG. 9D, currents having different phases may be applied to the first antenna array 121 and the second antenna array 122. For example, currents having the phases shown in the following <table 7> may be applied to the first patch antenna 121-1, the second patch antenna 121-2, the third patch antenna 121-3, the fourth patch antenna 121-4, the patch antenna 'a' 122a, the patch antenna 'b' 122b, the patch antenna 'c' 122c, and the patch antenna 'd' 122d. A beam 940 may be formed by currents having the phases shown in the following <table 7>.

TABLE 7

| | First patch antenna 121-1 | Second patch antenna 121-2 | Third patch antenna 121-3 | Fourth patch antenna 121-4 |
|---|---|---|---|---|
| Phase | 0° | 0° | 0° | 0° |

| | Patch antenna 'a' 121a | Patch antenna 'b' 121b | Patch antenna 'c' 121c | Patch antenna 'd' 121d |
|---|---|---|---|---|
| Phase | 280° | 280° | 280° | 280° |

In the case of the embodiment illustrated in FIG. 9D, since there is a phase difference between the first antenna array 121 and the second antenna array 122, the rate of signal transmission/reception in the z axis direction and/or −z axis direction may be relatively lower than that of the embodiment illustrated in FIG. 9A. On the contrary, the rate of signal transmission/reception in the y axis direction and/or −y axis direction may be relatively higher than that of the embodiment illustrated in FIG. 9A.

The electronic device 100 according to an embodiment of the present invention may include a housing 110 and an antenna module 120 arranged on one surface of the housing 110, wherein the antenna module 120 may include the printed circuit board 123 including a first layer (e.g., 123a) facing the one surface of the housing 110, a second layer (e.g., 123c) facing the first layer 123a, and at least one ground layer (e.g., 123-1) arranged between the first layer 123a and the second layer 123c, the first antenna array 121 arranged in the first layer 123a, the second antenna array 122 arranged in the second layer 123c and at least partially overlapping the first antenna array 121 when viewed from the one surface of the housing 110, and the communication circuit 124 (radio frequency integrated circuit (RFIC)) electrically connected to the first antenna array 121 and the second antenna array 122 and feeding the first antenna array 121 and the second antenna array 122, wherein the communication circuit 124 may be configured to receive a first signal from an external device (e.g., the base station 10 of FIG. 1) via at least one of the first antenna array 121 or the second antenna array 122, change a phase of at least a portion of the first antenna array 121 and the second antenna array 122 based on the first signal, and transmit/receive a second signal in a direction of a beam formed by the changed phase.

The communication circuit 124 according to an embodiment of the present invention may feed the first antenna array 121 and the second antenna array 122 so that a difference between the phase of the first antenna array 121 and the phase of the second antenna array 122 has a specified value.

The communication circuit 124 according to an embodiment of the present invention may change the phase of at least a portion of the first antenna array 121 and the second antenna array 122 so as to form the beam in a direction to the external device (e.g., the base station 10 of FIG. 1).

The first antenna array 121 according to an embodiment of the present invention may be spaced a specified distance apart from the second antenna array 122.

The antenna module 120 according to an embodiment of the present invention may be arranged in a region adjacent to a first edge of the housing 110, and an additional antenna modules (e.g., 130) may be further included, which is arranged in a region adjacent to a second edge facing the first edge.

The antenna module 120 according to an embodiment of the present invention may further include a feeding line (e.g., 125) connecting the communication circuit 124, the first antenna array 121, and the second antenna array 122.

Each of the first antenna array 121 and the second antenna array 122 according to an embodiment of the present invention may include the plurality of patch antennas 121-1, 121-2, 121-3, 121-4, 122a, 122b, 122c, and 122d.

The communication circuit 124 according to an embodiment of the present invention may feed each of the plurality of patch antennas 121-1, 121-2, 121-3, 121-4, 122a, 122b, 122c, and 122d so that a phase difference occurs between the plurality of patch antennas 121-1, 121-2, 121-3, 121-4, 122a, 122b, 122c, and 122d.

The plurality of patch antennas 121-1, 121-2, 121-3, 121-4, 122a, 122b, 122c, and 122d according to an embodiment of the present invention may be spaced a specified distance apart.

The first layer 123a and the second layer 123c according to an embodiment of the present invention may include an insulating material.

The antenna module 120 according to an embodiment of the present invention may include the printed circuit board 123 including the first layer 123a), the second layer 123c facing the first layer 123a, and at least one ground layer (e.g., 123-1, 123-2) arranged between the first layer 123a and the second layer 123c, the first antenna array 121 arranged in the first layer 123a, the second antenna array 122 arranged in the second layer 123c and at least partially overlapping the first antenna array 121 when viewed above the first layer 123a, and the communication circuit 124 (radio frequency integrated circuit (RFIC)) electrically connected to the first antenna array 121 and the second antenna array 122 and feeding the first antenna array 121 and the second antenna array 122, wherein the communication circuit 124 may be configured to receive a first signal from an external device (e.g., the base station 10 of FIG. 1) via at least one of the first antenna array 121 or the second antenna array 122, change a phase of at least a portion of the first antenna array 121 and the second antenna array 122 based on the first signal, and transmit/receive a second signal in a direction of a beam formed by the changed phase.

The communication circuit 124 according to an embodiment of the present invention may feed the first antenna array 121 and the second antenna array 122 so that a difference between the phase of the first antenna array 121 and the phase of the second antenna array 122 has a specified value.

The communication circuit 124 according to an embodiment of the present invention may change the phase of at least a portion of the first antenna array 121 and the second antenna array 122 so as to form the beam in a direction to the external device (e.g., the base station 10 of FIG. 1).

The first antenna array 121 according to an embodiment of the present invention may be spaced a specified distance apart from the second antenna array 122.

The electronic device 100 according to an embodiment of the present invention may further include a feeding line (e.g., 125) connecting the communication circuit 124, the first antenna array 121, and the second antenna array 122.

Each of the first antenna array 121 and the second antenna array 122 according to an embodiment of the present invention may include the plurality of patch antennas 121-1, 121-2, 121-3, 121-4, 122a, 122b, 122c, and 122d.

The communication circuit 124 according to an embodiment of the present invention may feed each of the plurality of patch antennas 121-1, 121-2, 121-3, 121-4, 122a, 122b, 122c, and 122d so that a phase difference occurs between the plurality of patch antennas.

The plurality of patch antennas 121-1, 121-2, 121-3, 121-4, 122a, 122b, 122c, and 122d according to an embodiment of the present invention may be spaced a specified distance apart.

The first layer 123a and the second layer 123c according to an embodiment of the present invention may include an insulating material.

The electronic device 100 according to an embodiment of the present invention may further include a non-conductive layer (e.g., 123b) arranged between the at least one ground layer (e.g., 123-1, 123-2).

The electronic device 100 according to an embodiment of the present invention may include: the housing 110 including a first plate 111, a second plate 112 oriented in an opposite direction to the first plate 111, and a side member surrounding a space between the first plate 111 and the second plate 112 and coupled to the second plate 112 or integrated with the second plate 112; a display viewed through at least a portion of the first plate 111; an antenna structure 120 arranged inside the housing 110 and including the printed circuit board 123 including a first surface 123a oriented in a first direction and a second surface 123c oriented in a second direction opposite to the first direction, the first region 126 including the first antenna array 121 which includes a plurality of first antenna elements 121-1, 121-2, 121-3, and 121-4 formed in the printed circuit board 123 or on the first surface 123a, the second region 127 including the second antenna array 122 which includes a plurality of second antenna elements 122a, 122b, 122c, and 122d formed closer to the second surface 123c than the plurality of first antenna elements 121-1, 121-2, 121-3, and 121-4 in the printed circuit board 123 or formed on the second surface 123c and at least partially overlapping the first region 126 when viewed above the first surface 123a, and ground layers 123-1 and 123-2 arranged between the first antenna array 121 and the second antenna array 122 in the printed circuit board 123 and at least partially overlapping the first region 126 and the second region 127 when viewed above the first surface 123a; and at least one wireless communication circuit 124 electrically connected to the first antenna array 121 and the second antenna array 122 and configured to transmit and/or receive a signal having a frequency between 3 GHz and 100 GHz.

The wireless communication circuit 124 according to an embodiment of the present invention may be arranged on at least one of the first surface 123a or the second surface 123c.

The plurality of first antenna elements 121-1, 121-2, 121-3, and 121-4 and the plurality of second antenna elements 122a, 122b, 122c, and 122d according to an embodiment of the present invention may be formed in the same shape.

The plurality of first antenna elements 121-1, 121-2, 121-3, and 121-4 and the plurality of second antenna elements 122a, 122b, 122c, and 122d according to an embodiment of the present invention may include a patch antenna.

Figure 10:
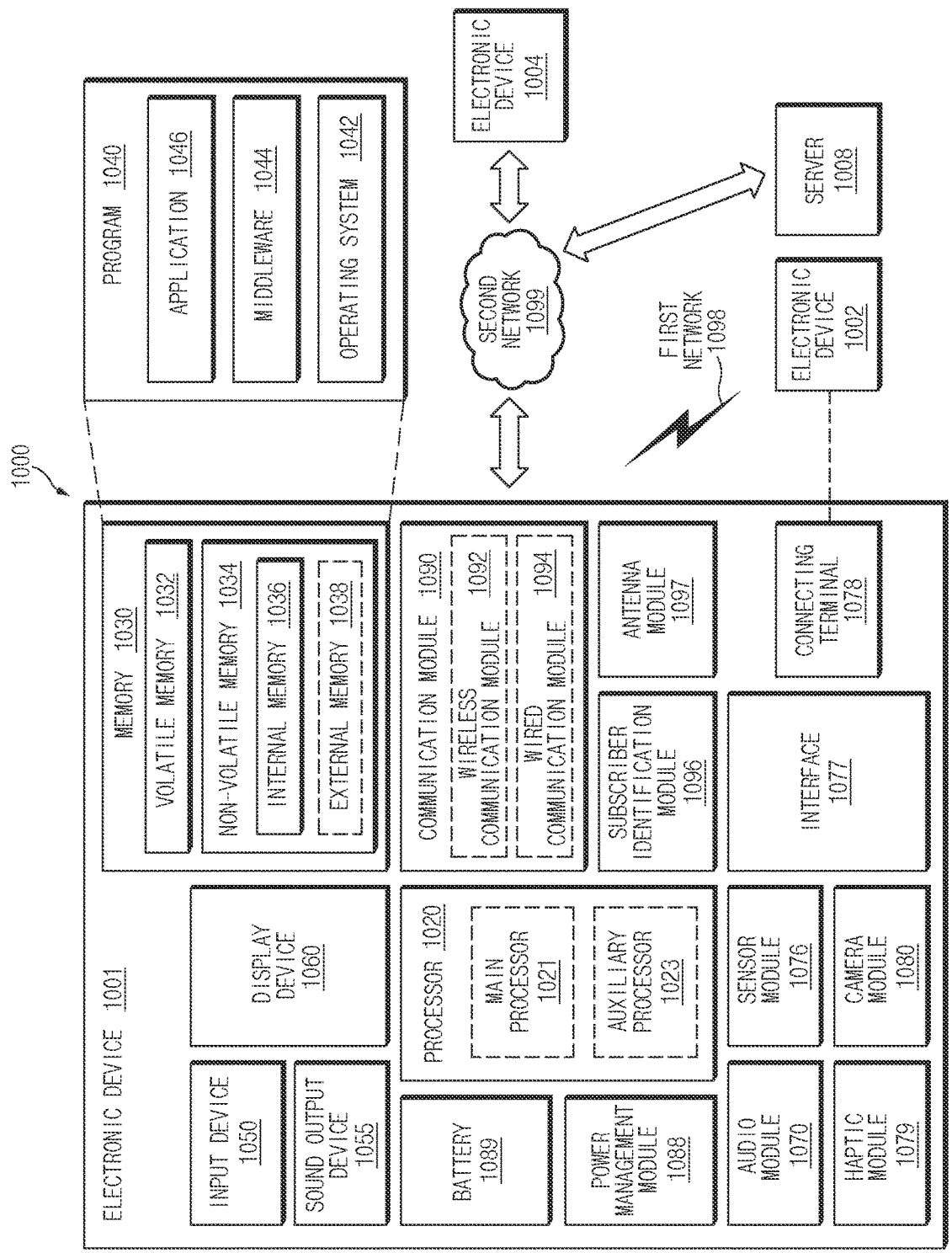
FIG. 10 is a block diagram illustrating an electronic device in a network environment according to various embodiments.

FIG. 10 is a block diagram illustrating an electronic device 1001 in a network environment 1000 according to various embodiments.

Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. The antenna module 1097 may be formed of a conductive material or a conductive pattern according to an embodiment, and may further include other components (e.g., RFIC) in addition to the conductive material or the conductive pattern according to some embodiments. According to an embodiment, the antenna module 1097 may include one or more antennas. In such a case, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
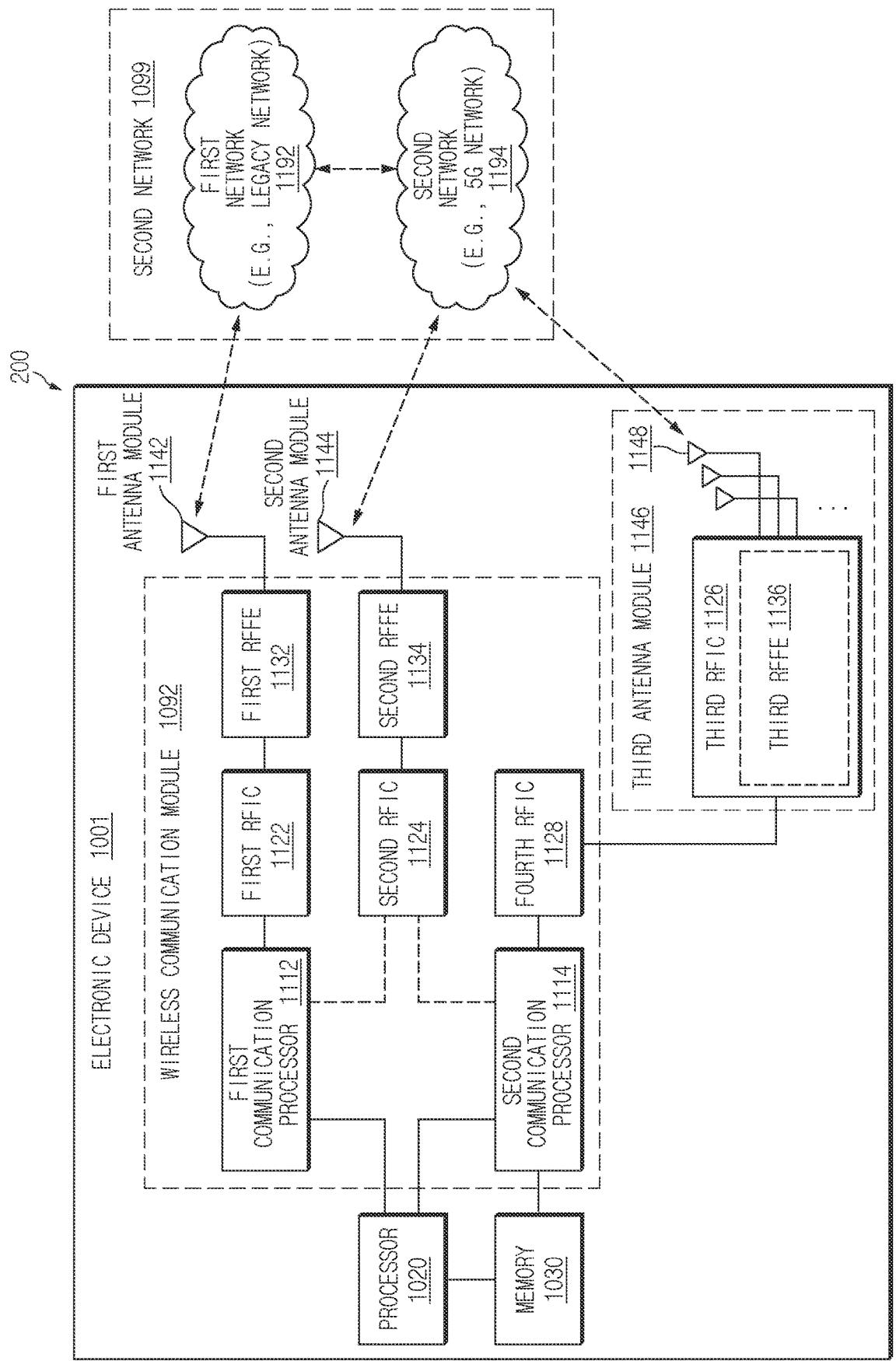
FIG. 11 is a block diagram illustrating an electronic device for supporting legacy network communication and 5G network communication according to various embodiments.

FIG. 11 is a block diagram 1100 illustrating an electronic device 1001 for supporting legacy network communication and 5G network communication according to various embodiments.

Referring to FIG. 11, the electronic device 1001 may include a first communication processor 1112, a second communication processor 1114, a first radio frequency integrated circuit (RFIC) 1122, a second RFIC 1124, a third RFIC 1126, a fourth RFIC 1128, a first radio frequency front end (RFFE) 1132, a second RFFE 1134, a first antenna module 1142, a second antenna module 1144, and an antenna 1148. The electronic device 1001 may further include a processor 1020 and a memory 1030. A network 1099 may include a first network 1192 and a second network 1194. According to another embodiment, the electronic device 1001 may further include at least one of the components illustrated in FIG. 10, and the network 1099 may include at least one other network. According to an embodiment, the first communication processor 1112, the second communication processor 1114, the first RFIC 1122, the second RFIC 1124, the fourth RFIC 1128, the first RFFE 1132, and the second RFFE 1134 may form at least a portion of the wireless communication module 1092. In another embodiment, the fourth RFIC 1128 may not be provided or may be included as a portion of the third RFIC 1126.

The first communication processor 1112 may support establishment of a communication channel of a band to be used for communication with the first network 1192 and support legacy network communication through an established communication channel. According to various embodiments, the first network may be a legacy network including a second generation (2G), 3G, 4G, or long term evolution (LTE) network. The second communication processor 1114 may support establishment of a communication channel corresponding to a specified band (e.g., about 6 GHz to about 60 GHz) among bands to be used for communication with the second network 1194 and support 5G network communication through an established communication channel According to various embodiments, the second network 1194 may be a 5G network defined by the 3GPP. In addition, according to an embodiment, the first communication processor 1112 or the second communication processor 1114 may support establishment of a communication channel corresponding to another specified band (e.g., about 6 GHz or less) among bands to be used for communication with the second network 1194 and support 5G network communication through an established communication channel According to an embodiment, the first communication processor 1112 and the second communication processor 1114 may be implemented within a single chip or single package. According to various embodiments, the first communication processor 1112 and the second communication processor 1114 may be formed within a single chip or single package together with the processor 1020, the auxiliary processor 1023, or the communication module 1090.

When performing transmission, the first RFIC 1122 may convert a baseband signal generated by the first communication processor 1112 into a radio frequency (RF) signal of about 700 MHz to about 3 GHz used in the first network 1192 (e.g., a legacy network). When performing reception, an RF signal may be obtained from the first network 1192 (e.g., a legacy network) via an antenna (e.g., the first antenna module 1142) and may be preprocessed through an RFFE (e.g., the first RFFE 1132). The first RFIC 1122 may convert the preprocessed RF signal into a baseband signal so that the signal may be processed by the first communication processor 1112.

When performing transmission, the second RFIC 1124 may convert a baseband signal generated by the first communication processor 1112 or the second communication processor 1114 into an RF signal (hereinafter referred to as a 5G Sub6 RF signal) of Sub6 band used in the second network 1194 (e.g., a 5G network). When performing reception, a 5G Sub6 RF signal may be obtained from the second network 1194 (e.g., a 5G network) via an antenna (e.g., the second antenna module 1144) and may be preprocessed through an RFFE (e.g., the second RFFE 1134). The second RFIC 1124 may convert the preprocessed 5G Sub6 RF signal into a baseband signal so that the signal may be processed by a corresponding communication processor among the first communication processor 1112 and the second communication processor 1114.

The third RFIC 1126 may convert a baseband signal generated by the second communication processor 1114 into an RF signal (hereinafter referred to as a 5G Above6 RF signal) of Above6 band (e.g., about 6 GHz to about 60 GHz) to be used in the second network 1194 (e.g., a 5G network). When performing reception, a 5G Above6 RF signal may be obtained from the second network 1194 (e.g., a 5G network) via an antenna (e.g., the antenna 1148) and may be preprocessed through the third RFFE 1136. The third RFIC 1126 may convert the preprocessed 5G Above6 RF signal into a baseband signal so that the signal may be processed by the second communication processor 1114. According to an embodiment, the third RFFE 1136 may be formed as a portion of the third RFIC 1126.

According to an embodiment, the electronic device 1001 may include the fourth RFIC 1128 separately from the third RFIC 1126 or as at least a portion of the third RFIC 1126. In this case, the fourth RFIC 1128 may convert a baseband signal generated by the second communication processor 1114 into an RF signal (hereinafter referred to as an IF signal) of an intermediate frequency band (e.g., about 9 GHz to about 11 GHz), and then may transfer the IF signal to the third RFIC 1126. The third RFIC 1126 may convert the IF signal into a 5G Above6 RF signal. When performing reception, a 5G Above6 RF signal may be received from the second network 1194 (e.g., a 5G network) via an antenna (e.g., the antenna 1148) and may be converted into an IF signal by the third RFIC 1126. The fourth RFIC 1128 may convert the IF signal into a baseband signal so that the signal may be processed by the second communication processor 1114.

According to an embodiment, the first RFIC 1122 and the second RFIC 1124 may be implemented as at least a portion of a single chip or single package. According to an embodiment, the first RFFE 1132 and the second RFFE 1134 may be implemented as at least a portion of a single chip or single package. According to an embodiment, at least one antenna module among the first antenna module 1142 and the second antenna module 1144 may not be provided or may be combined with another antenna module so as to process RF signals of a plurality of corresponding bands.

According to an embodiment, the third RFIC 1126 and the antenna 1148 may be arranged on the same substrate to form the third antenna module 1146. For example, the wireless communication module 1092 or the processor 1020 may be arranged on a first substrate (e.g., main PCB). In this case, the third RFIC 1126 may be arranged in a partial region (e.g., lower surface) of a second substrate (e.g., sub PCB) that is separate from the first substrate and the antenna 1148 may be arranged in another partial region (e.g., upper surface) to form the third antenna module 1146. According to an embodiment, the antenna 1148 may include, for example, an antenna array that may be used for beamforming. It is possible to decrease a length of a transmission line between the third RFIC 1126 and the antenna 1148 by arranging the third RFIC 1126 and the antenna 1148 on the same substrate. This configuration, for example, may reduce loss (e.g., attenuation), caused by the transmission line, of a signal of a high frequency band (e.g., about 6 GHz to about 60 GHz) used in 5G network communication. Accordingly, the electronic device 1001 may improve quality or speed of communication with the second network 1194 (e.g., a 5G network).

The second network 1194 (e.g., a 5G network) may operate independent of the first network 1192 (e.g., a legacy network) (e.g., Stand-Alone (SA)) or may operate by being connected thereto (e.g., Non-Stand Alone (NSA)). For example, a 5G network may include only an access network (e.g., 5G radio access network (RAN) or next generation RAN (NG RAN)), and may not have a core network (e.g., next generation core (NGC)). In this case, the electronic device 1001 may access an external network (e.g., the Internet) by being controlled by a core network (e.g., evolved packed core (EPC)) of a legacy network after accessing the access network of the 5G network. Protocol information (e.g., LTE protocol information) for communicating with a legacy network or protocol information (e.g., New Radio (NR)) for communicating with a 5G network may be stored in the memory 1130, and may be accessed by other components (e.g., the processor 1020, the first communication processor 1112, or the second communication processor 1114).

Figure 12:
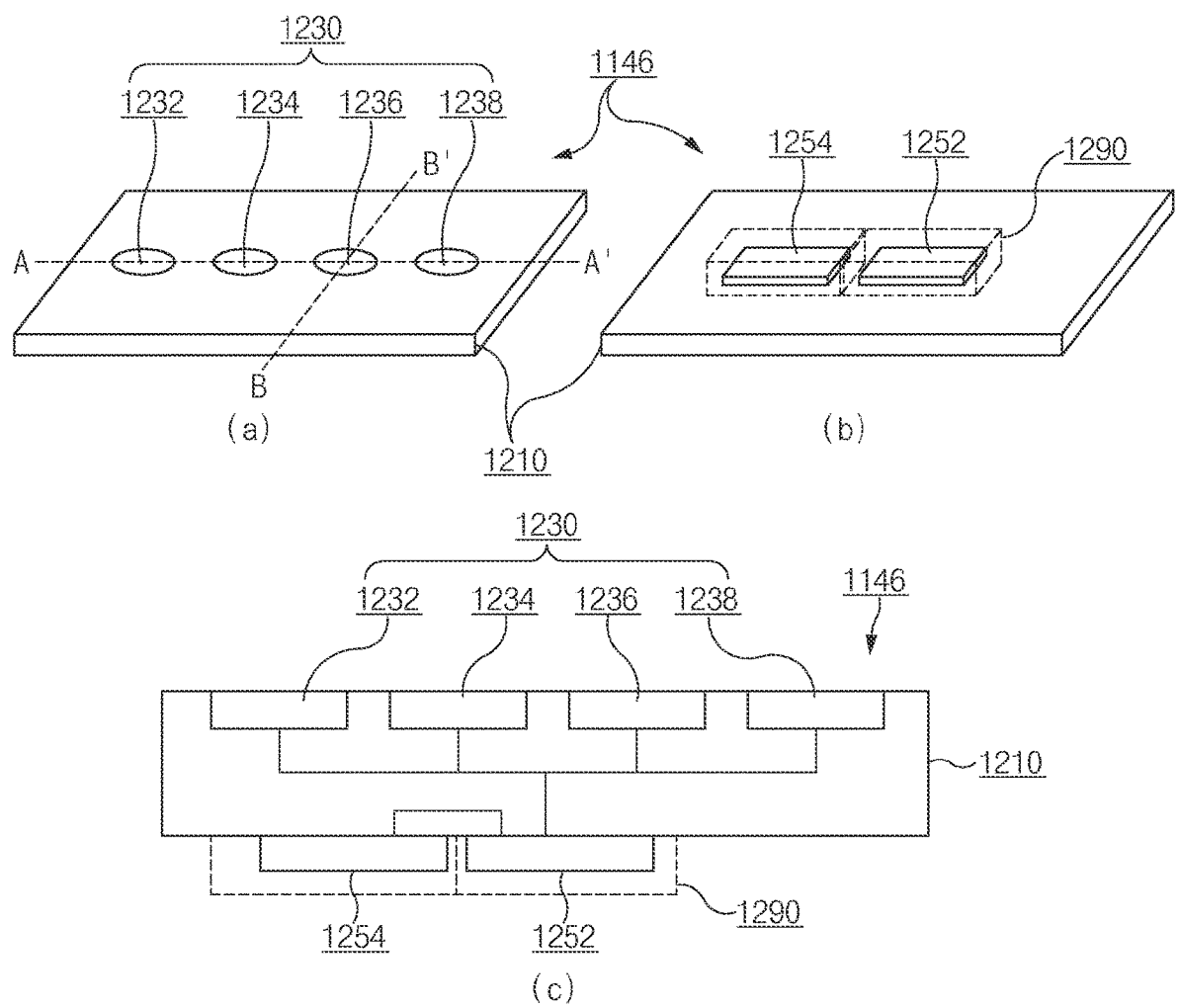
FIG. 12 illustrates a structure of a third antenna module according to an embodiment.

FIG. 12 illustrates a structure of a third antenna module according to an embodiment. FIG. 12 illustrates, for example, an embodiment of a structure of the third antenna module 1146 described with reference to FIG. 11.

FIG. 12A is a perspective view of the third antenna module 1146 as viewed from one side, and FIG. 12B is a perspective view of the third antenna module 1146 as viewed from another side. FIG. 12C is a cross-sectional view of the third antenna module 1146 taken along line A-A'.

Referring to FIG. 12, in an embodiment, the third antenna module 1146 may include a printed circuit board 1210, an antenna array 1230, a radio frequency integrated circuit (RFIC) 1252, a power manage integrate circuit (PMIC) 1254, and a module interface 1270. Optionally, the third antenna module 1146 may further include a shielding member 1290. In other embodiments, at least one of the above-mentioned components may not be provided, or at least two of the above-mentioned components may be integrated.

The printed circuit board 1210 may include a plurality of conductive layers and a plurality of non-conductive layers stacked alternately with the conductive layers. The printed circuit board 1210 may provide an electric connection between the printed circuit board 1210 and/or externally arranged various electronic components using lines and conductive vias formed in the conductive layers.

The antenna array 1230 (e.g., 1148 of FIG. 11) may include a plurality of antenna elements 1232, 1234, 1236, or 1238 arranged to form a directional beam. The antenna elements may be formed on a first surface of the printed circuit board 1210 as illustrated in the figure. According to another embodiment, the antenna array 1230 may be formed inside the printed circuit board 1210. According to embodiments, the antenna array 1230 may include a plurality of antenna arrays (e.g., a dipole antenna array and/or a patch antenna array) of the same shape or type or different shapes or types.

The RFIC 1252 (e.g., 1126 of FIG. 11) may be arranged in another region (e.g., a second surface opposite to the first surface) of the printed circuit board 1210 spaced apart from the antenna array. The RFIC is configured to process a signal of a selected frequency band, which is transmitted/received through the antenna array 1230. According to an embodiment, when performing transmission, the RFIC 1252 may convert a baseband signal obtained from a communication processor (not shown) into an RF signal of a specified band. When performing reception, the RFIC 1252 may convert an RF signal received via the antenna array 1252 into a baseband signal and may transfer the baseband signal to the communication processor.

According to another embodiment, when performing transmission, the RFIC 1252 may up-convert an IF signal (e.g., about 9 GHz to about 11 GHz) obtained from an intermediate frequency integrate circuit (IFIC) (e.g., 1128 of FIG. 11) into an RF signal of a selected band. When performing reception, the RFIC 1252 may down-convert an RF signal obtained via the antenna array 1252 into an IF signal and may transfer the IF signal to the IFIC.

The PMIC 1254 may be arranged in another partial region (e.g., the second surface) of the printed circuit board 1210 spaced apart from the antenna array. The PMIC may be supplied with power from a main PCB (not shown) and may supply required power to various components (e.g., the RFIC 1252) on an antenna module.

The shielding member 1290 may be arranged on a portion (e.g., the second surface) of the printed circuit board 1210 so as to electromagnetically shield at least one of the RFIC 1252 or the PMIC 1254. According to an embodiment, the shielding member 1290 may include a shield can.

Although not illustrated, in various embodiments, the third antenna module 1146 may be electrically connected to another printed circuit board (e.g., a main circuit board) via a module interface. The module interface may include a connection member, for example, a coaxial cable connector, a board-to-board connector, interposer, or a flexible printed circuit board (FPCB). The RFIC 1252 and/or the PMIC 1254 of the antenna module may be electrically connected to the printed circuit board via the connection member.

Figure 13:
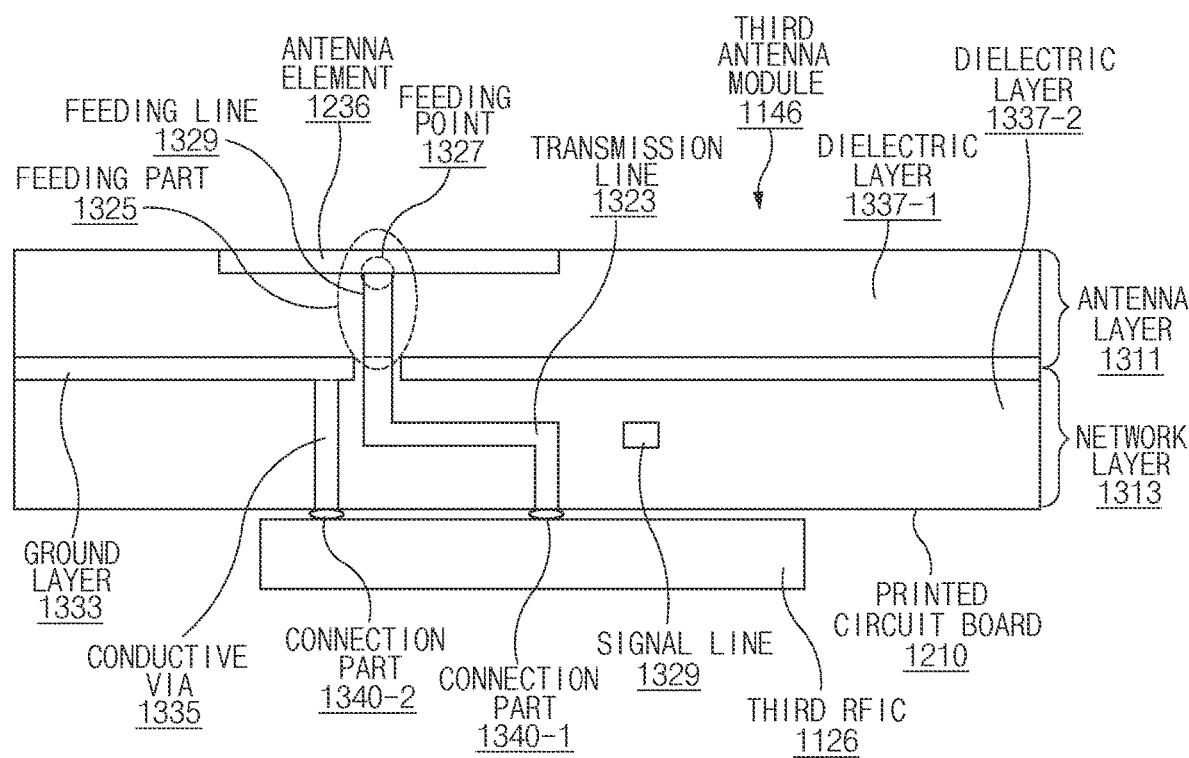
FIG. 13 illustrates a cross-section of a third antenna module according to an embodiment.

FIG. 13 illustrates a cross-section of a third antenna module according to an embodiment. FIG. 13 illustrates a cross-section of the third antenna module 1146 of (a) of FIG. 12 taken along line B-B'. The printed circuit board 1210 of the illustrated embodiment may include an antenna layer 1311 and a network layer 1313.

The antenna layer 1311 may include at least one dielectric layer 1337-1 and an antenna element 1236 and/or feeding portion 1325 formed on an external surface of the dielectric layer or formed therein. The feeding portion 1325 may include a feeding point 1327 and/or a feeding line 1329.

The network layer 1313 may include at least one dielectric layer 1337-2 and at least one ground layer 1333, at least one conductive via 1335, transmission line 1323, and/or signal line 1329 formed on an external surface of the dielectric layer or formed therein.

In addition, in the illustrated embodiment, the third RFIC 1126 of (c) of FIG. 12 may be electrically connected to the network layer 1313 via, for example, first and second connection portions (solder bumps) 1340-1 and a40-2. In other embodiments, various connection structures (e.g., solder or BGA) may be used instead of the connection portions. The third RFIC 1126 may be electrically connected to the antenna element 1236 via the first connection portion 1340-1, the transmission line 1323, and the feeding portion 1325. The third RFIC 1126 may be electrically connected to the ground layer 1333 via the second connection portion 1340-2 and the conductive via 1335. Although not illustrated, the third RFIC 1126 may be connected to the above-mentioned module interface via the signal line 1329.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
 a housing; and
 an antenna circuitry disposed on one surface of the housing, wherein the antenna circuitry comprises:
  a printed circuit board comprising a first layer facing the one surface of the housing, a second layer facing the first layer, and at least one ground layer disposed between the first layer and the second layer;
  a first antenna array disposed on the first layer;
  a second antenna array disposed on the second layer and at least partially overlapping the first antenna array when viewed from the one surface of the housing; and
  a communication circuit comprising a radio frequency integrated circuit (RFIC) and being electrically connected to the first antenna array and the second antenna array, the communication circuit feeding the first antenna array and the second antenna array, and
 wherein the communication circuit is configured to:
 feed the first antenna array and the second antenna array such that a phase difference between the first antenna array and the second antenna array has a specific value; and
 transmit or receive a signal in a direction of a beam by using the first antenna array and the second antenna array, wherein the direction of the beam is dependent on the specific value.

2. The electronic device of claim 1, wherein the communication circuit feeds the first antenna array and the second antenna array so that a difference between a phase of the first antenna array and a phase of the second antenna array maintains a specified value.

3. The electronic device of claim 1, wherein the communication circuit changes a phase of at least a portion of the first antenna array and the second antenna array so as to form the beam in the direction to an external device.

4. The electronic device of claim 1, wherein the first antenna array is spaced a specified distance apart from the second antenna array.

5. The electronic device of claim 1,
 wherein the antenna circuitry is disposed in a region adjacent to a first edge of the housing, and
 wherein the electronic device further comprises an additional antenna circuitry disposed in a region adjacent to a second edge facing the first edge.

6. The electronic device of claim 1, wherein the antenna circuitry further comprises a feeding line connecting the communication circuit, the first antenna array, and the second antenna array.

7. The electronic device of claim 1, wherein each of the first antenna array and the second antenna array comprises a plurality of patch antennas.

8. The electronic device of claim 7, wherein the communication circuit feeds each of the plurality of patch antennas so that the phase difference occurs between the plurality of patch antennas.

9. The electronic device of claim 7, wherein the plurality of patch antennas are spaced a specified distance apart.

10. The electronic device of claim 1, wherein the first layer and the second layer comprise an insulating material.

11. The electronic device of claim 1, wherein the direction of the beam includes:
 a first direction parallel to the first layer; or
 a second direction perpendicular to the first layer.

12. The electronic device of claim 11, wherein the communication circuit is further configured to:
 feed the first antenna array and the second antenna array out-of-phase to transmit the signal in the first direction; or
 feed the first antenna array and the second antenna array in-phase to transmit the signal in the second direction.

13. The electronic device of claim 1, wherein the communication circuit is further configured to:
 receive a first signal from an external device via at least one of the first antenna array or the second antenna array; and
 based on the first signal, determine the specific value.

14. The electronic device of claim 13, wherein the communication circuit is further configured to:
 based on the first signal, determine an orientation of the external device and the electronic device; and
 based on the determination of the orientation of the external device and the electronic device, feed the first antenna array and the second antenna array such that the phase difference has the specific value.

15. An antenna circuitry comprising:
 a printed circuit board comprising a first layer, a second layer facing the first layer, and at least one ground layer disposed between the first layer and the second layer;
 a first antenna array disposed on the first layer;
 a second antenna array disposed on the second layer and at least partially overlapping the first antenna array when viewed above the first layer; and
 a communication circuit comprising a radio frequency integrated circuit (RFIC) and being electrically connected to the first antenna array and the second antenna array, the communication circuit feeding the first antenna array and the second antenna array,
 wherein the communication circuit is configured to:
  feed the first antenna array and the second antenna array such that a phase difference between the first antenna array and the second antenna array has a specific value; and
  transmit or receive a signal in a direction of a beam by using the first antenna array and the second antenna array, wherein the direction of the beam is dependent on the specific value.

16. The antenna circuitry of claim 15, wherein the communication circuit feeds the first antenna array and the second antenna array so that a difference between a phase of the first antenna array and a phase of the second antenna array maintains a specified value.

17. The antenna circuitry of claim 15, wherein the communication circuit changes a phase of at least a portion of the first antenna array and the second antenna array so as to form the beam in the direction to an external device.

18. The antenna circuitry of claim 15, wherein the first antenna array is spaced a specified distance apart from the second antenna array.

19. The antenna circuitry of claim 15, further comprising a feeding line connecting the communication circuit, the first antenna array, and the second antenna array.

* * * * *